(12) United States Patent
Kim

(10) Patent No.: US 9,641,476 B2
(45) Date of Patent: May 2, 2017

(54) MOBILE TERMINAL AND CONTROLLING METHOD THEREOF

(71) Applicant: LG ELECTRONICS INC., Seoul (KR)

(72) Inventor: Taeyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 14/482,778

(22) Filed: Sep. 10, 2014

(65) Prior Publication Data

US 2015/0200901 A1   Jul. 16, 2015

(30) Foreign Application Priority Data

Jan. 13, 2014  (KR) .......................... 10-2014-0003746

(51) Int. Cl.
  *H04L 12/58* (2006.01)
  *G06F 3/0486* (2013.01)
  *G06Q 10/10* (2012.01)

(52) U.S. Cl.
  CPC ............ *H04L 51/28* (2013.01); *G06F 3/0486* (2013.01); *G06Q 10/107* (2013.01)

(58) Field of Classification Search
  CPC ......... H04L 51/00–51/38; G06F 3/00–3/0486; G06Q 10/10–10/107
  See application file for complete search history.

(56) References Cited

U.S. PATENT DOCUMENTS

| | | | | |
|---|---|---|---|---|
| 2002/0129275 | A1* | 9/2002 | Decuir ................ | H04L 63/0428 726/28 |
| 2007/0180060 | A1* | 8/2007 | Patel .................... | G06Q 10/107 709/219 |
| 2009/0079699 | A1* | 3/2009 | Sun ....................... | G06F 3/0488 345/173 |
| 2009/0182824 | A1* | 7/2009 | Haynes ................. | H04L 51/16 709/206 |
| 2011/0225245 | A1* | 9/2011 | Bhogal ................. | G06Q 10/107 709/206 |
| 2013/0024780 | A1* | 1/2013 | Sutedja ................. | G06Q 10/107 715/752 |
| 2014/0229159 | A1* | 8/2014 | Branton ............... | G06F 17/30719 704/9 |

(Continued)

*Primary Examiner* — Nicholas Taylor
*Assistant Examiner* — Clayton R Williams
(74) *Attorney, Agent, or Firm* — Ked & Associates, LLP

(57) ABSTRACT

Disclosed are a mobile terminal and controlling method thereof, including wireless communication unit configured to transceive mails, touchscreen configured to display at least one first mail previously received through the wireless communication unit, and controller, when a command for a reply or forwarding of the displayed first mail is inputted, displaying a composing window of a second mail including the first mail, the controller, when at least one mail address information included in at least one original text in the first mail is selected from the composing window, automatically setting a mail address matching the selected mail address information as a recipient or carbon copy mail address of the second mail. Accordingly, when a mail address of a recipient or carbon copy of a replied or forwarded mail for a received mail, the mail address can be conveniently set using mail address information included in the received mail.

19 Claims, 26 Drawing Sheets

(56) References Cited

U.S. PATENT DOCUMENTS

| | | | | |
|---|---|---|---|---|
| 2014/0321720 A1* | 10/2014 | Bank | .................. | G06K 9/00308 |
| | | | | 382/118 |
| 2014/0365505 A1* | 12/2014 | Clark | ................ | G06F 17/30864 |
| | | | | 707/748 |
| 2016/0188181 A1* | 6/2016 | Smith | ..................... | G06F 3/048 |
| | | | | 715/765 |

* cited by examiner

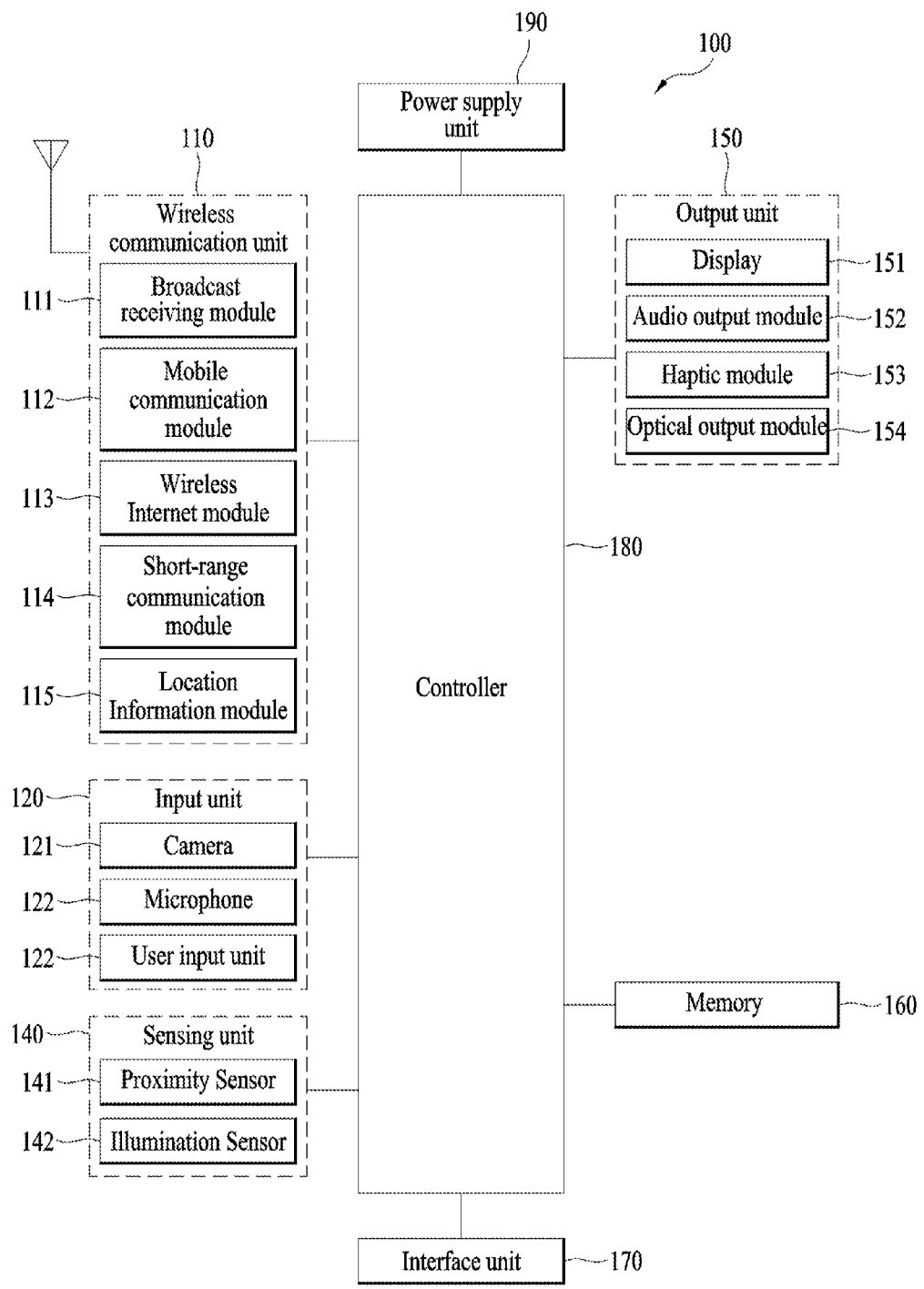

FIG. 6
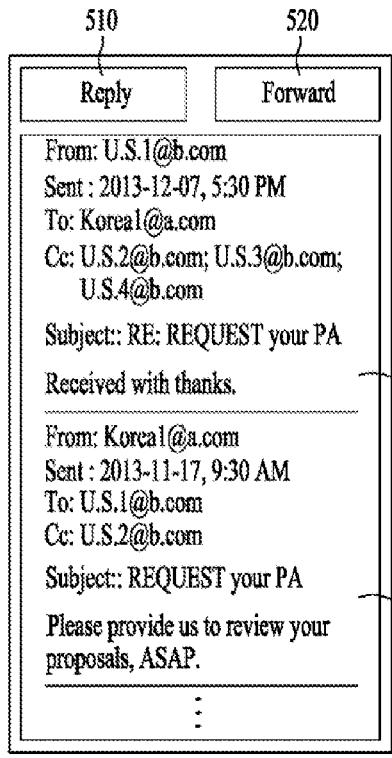
(a)
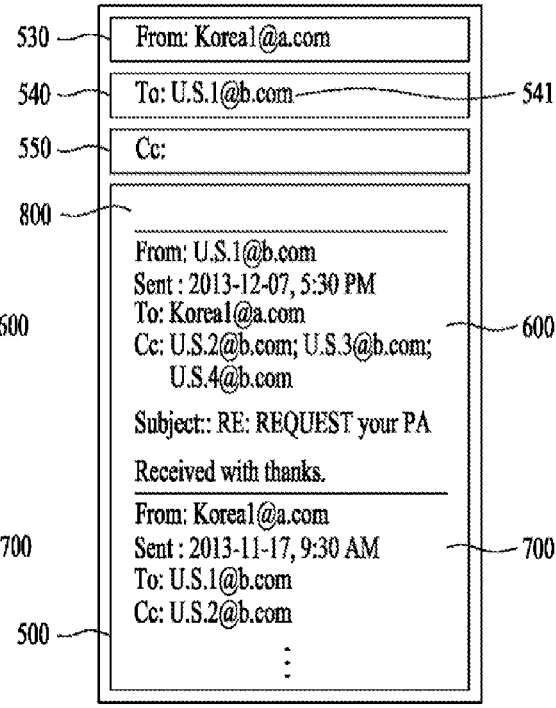
(b)
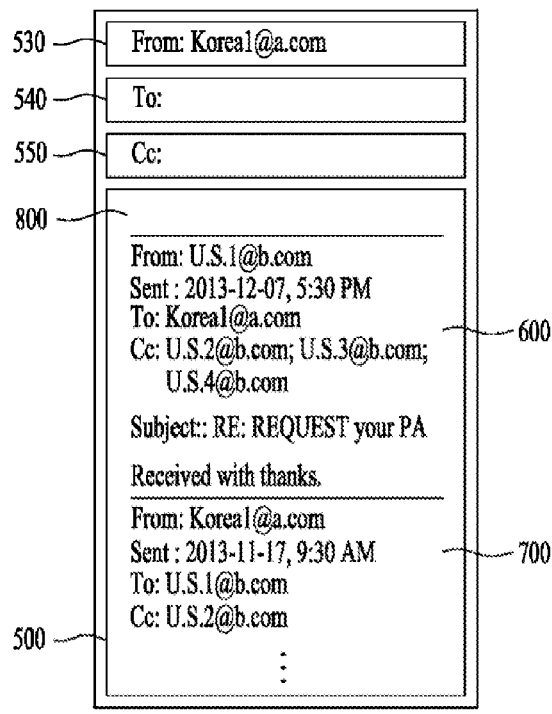
(c)

FIG. 7
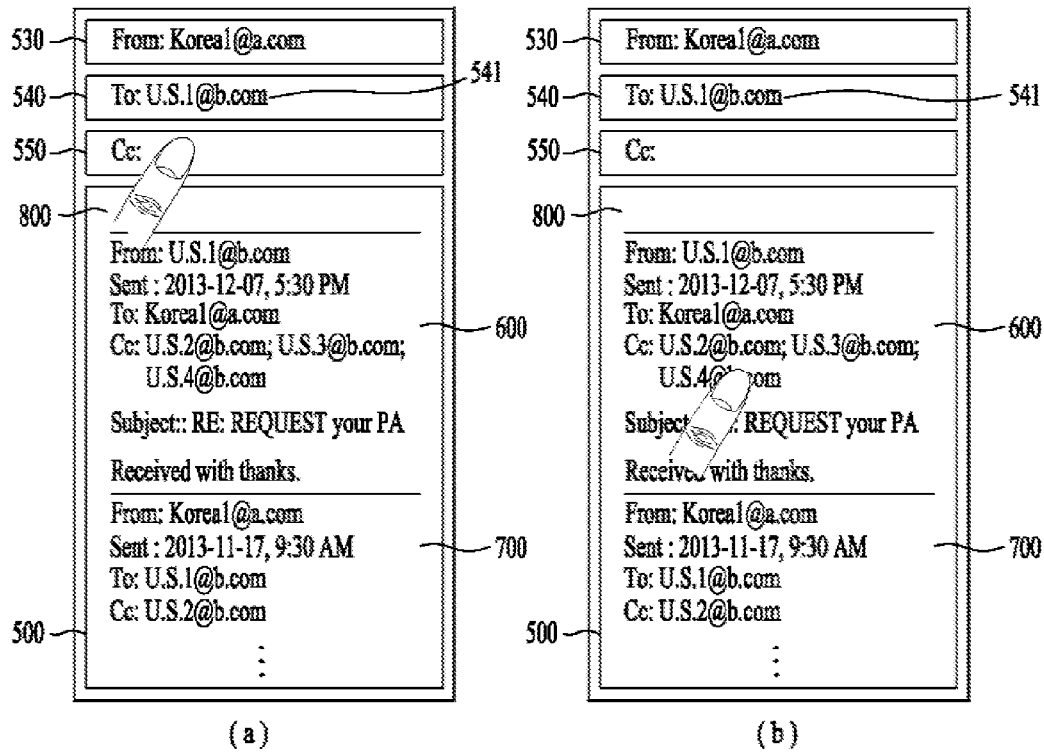
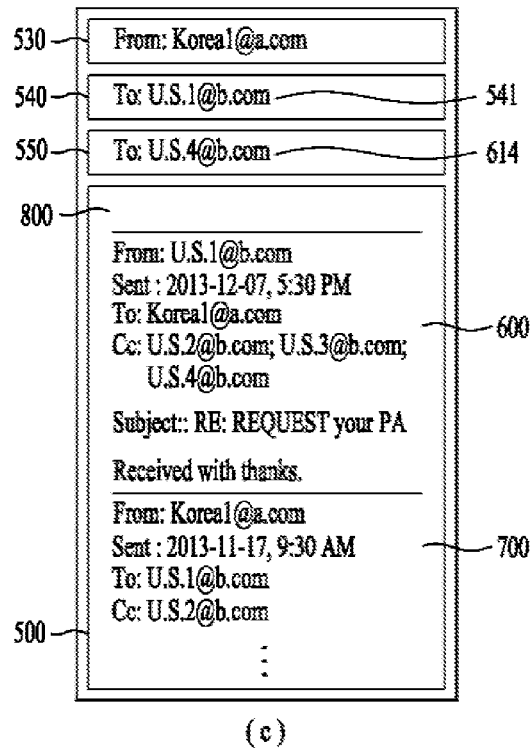

FIG. 8
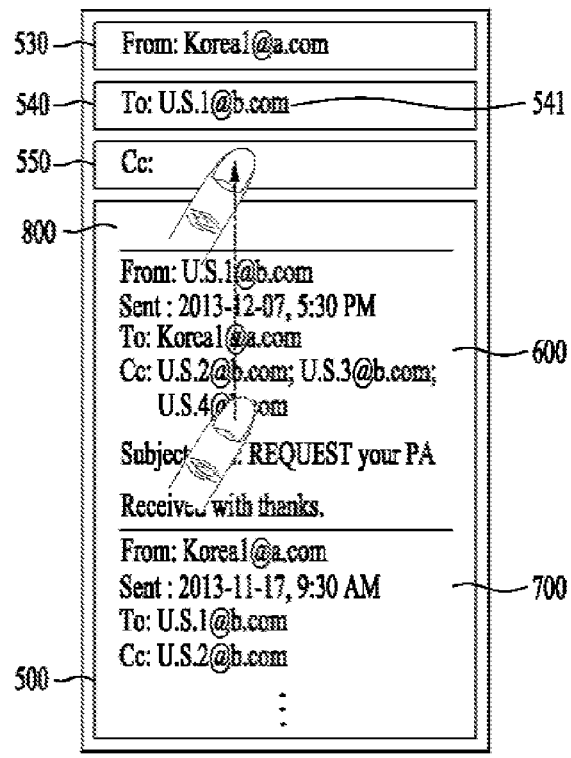
(a)
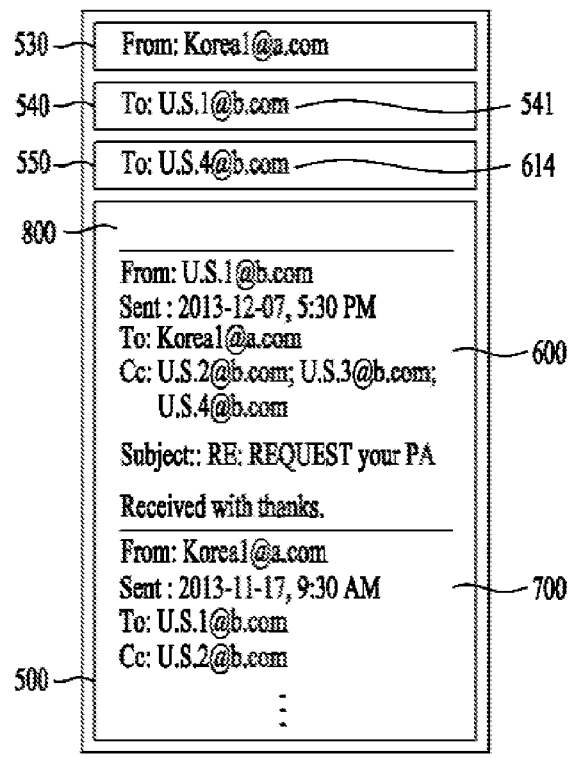
(b)

FIG. 10
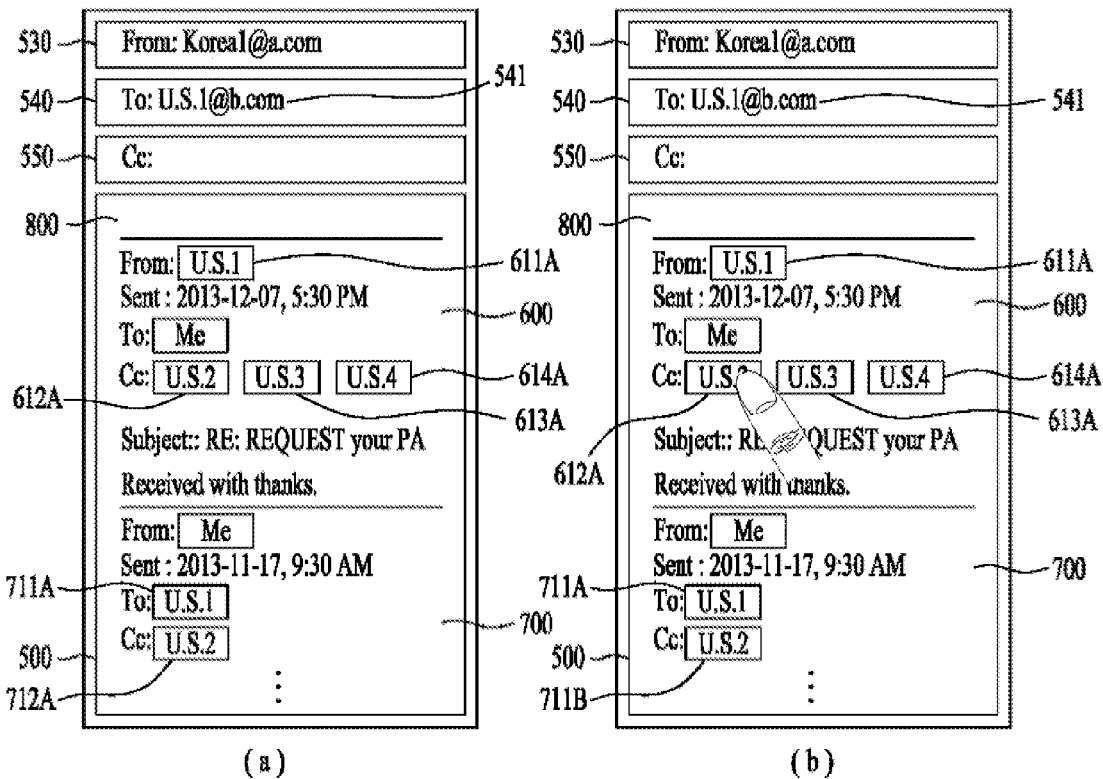
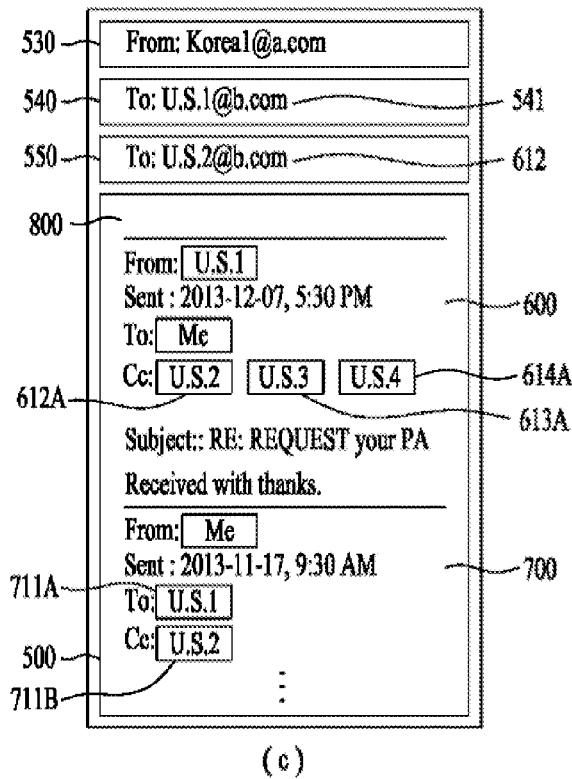

FIG. 11
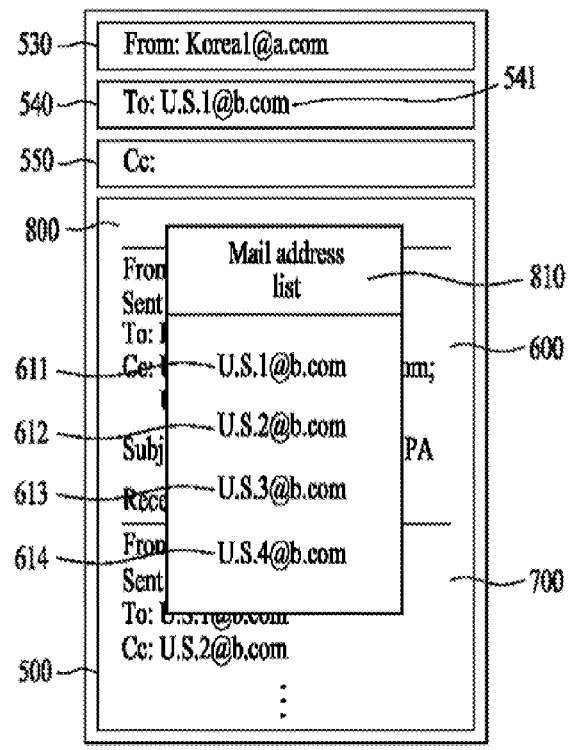
(a)
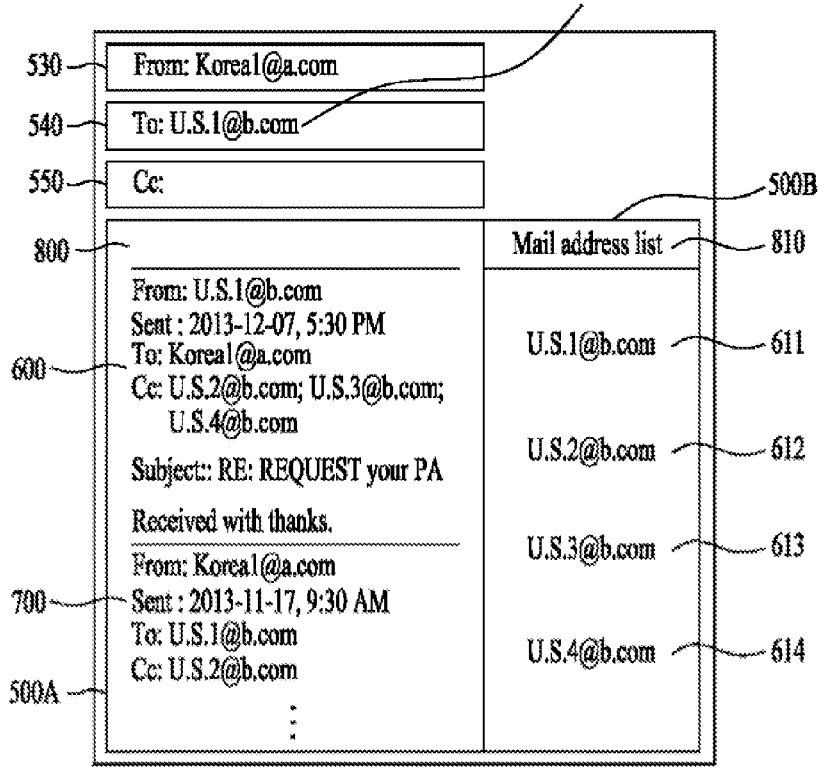
(b)

530 — From: Korea1@a.com
540 — To: U.S.1@b.com — 541
550 — Cc:
800 —

From: U.S.1@b.com
Sent : 2013-12-07, 5:30 PM
To: Korea1@a.com
Cc: U.S.2@b.com; U.S.3@b.com;
614 — U.S.4@b.com
Subject: RE: REQUEST your PA
Received with thanks.
— 600

From: Korea1@a.com
Sent : 2013-11-17, 9:30 AM
To: U.S.1@b.com
Cc: U.S.2@b.com
— 700

500 —
⋮

(b)

530 — From: Korea1@a.com
540 — To: U.S.1@b.com — 541
550 — Cc:
800 —

From: U.S.1@b.com
Sent : 2013-12-07, 5:30 PM
To: Korea1@a.com
Cc: U.S.2@b.com; U.S.3@b.com;
— 600

Subject:: RE: REQUEST your PA
Received with thanks.

From: Korea1@a.com
Sent : 2013-11-17, 9:30 AM
To: U.S.1@b.com
Cc: U.S.2@b.com
— 700

- 530 — From: Korea1@a.com
- 540 — To: U.S.1@b.com — 541
- 550 — Cc:
- 800 —

From: U.S.1@b.com
  Sent : 2013-12-07, 5:30 PM
  To: Korea1@a.com
  Cc: U.S.2@b.com; U.S.3@b.com;
  614 — U.S.4@b.com
  Subject:: RE: REQUEST your PA
  Received with thanks.

From: Korea1@a.com
  Sent : 2013-11-17, 9:30 AM
  To: U.S.1@b.com
  Cc: U.S.2@b.com
  ⋮

— 600
  — 700

- 500

(b)

- 530 — From: Korea1@a.com
- 540 — To: U.S.1@b.com — 541
- 550 — Cc:
- 800 —

From: U.S.1@b.com ☐ Check Box
  Sent : 2013-12-07, 5:30 PM
  To: Korea1@a.com ☐
  Cc: U.S.2@b.com; U.S.3@b.com;
  840 — ☐      ☐
  U.S.4@b.com ☐
  Subject:: RE: REQUEST your PA
  Received with thanks.

From: Korea1@a.com ☐
  Sent : 2013-11-17, 9:30 AM
  To: U.S.1@b.com ☐
  Cc: U.S.2@b.com ☐
  ⋮

— 600
  — 700

- 500

FIG. 17
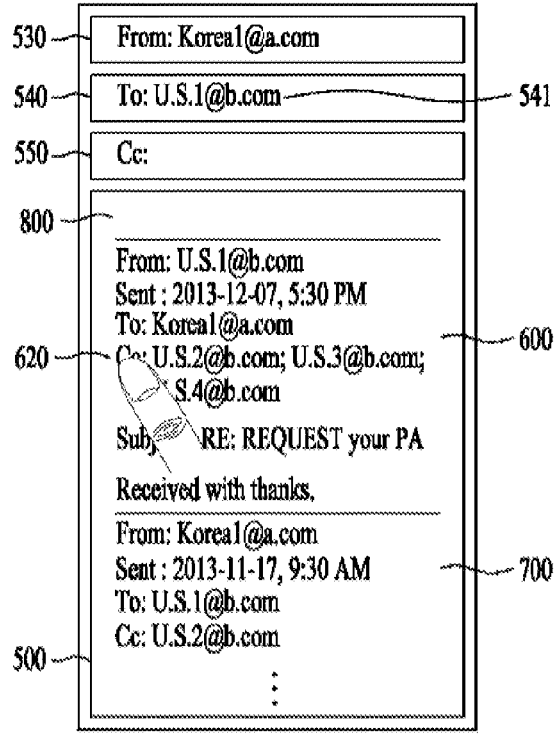
(a)
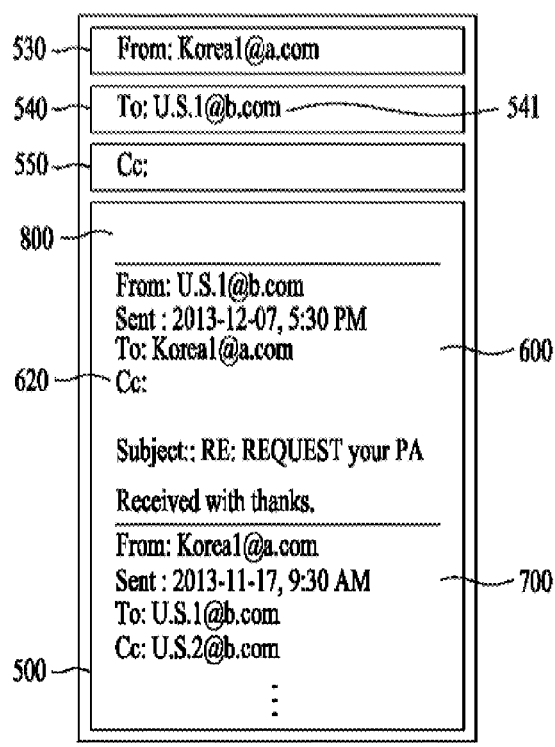
(b)

FIG. 18
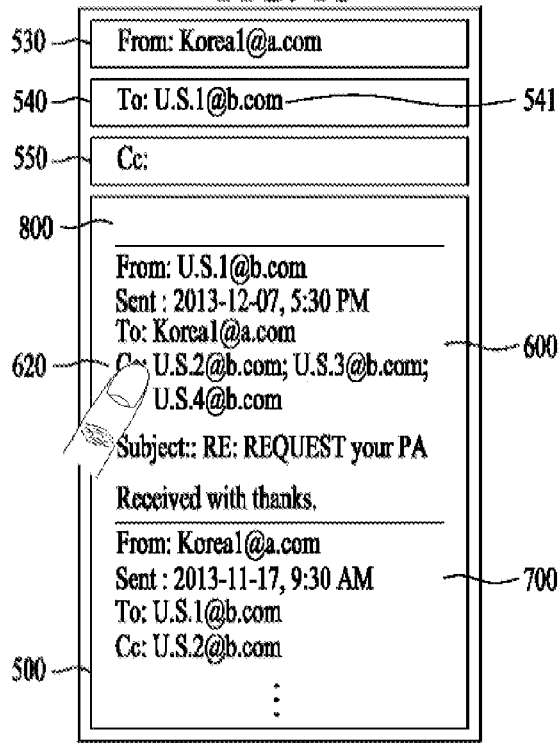
(a)
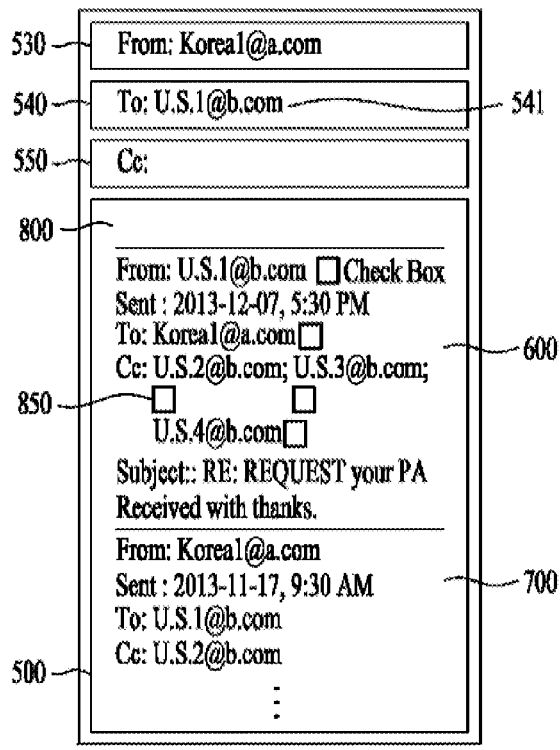
(b)

FIG. 19
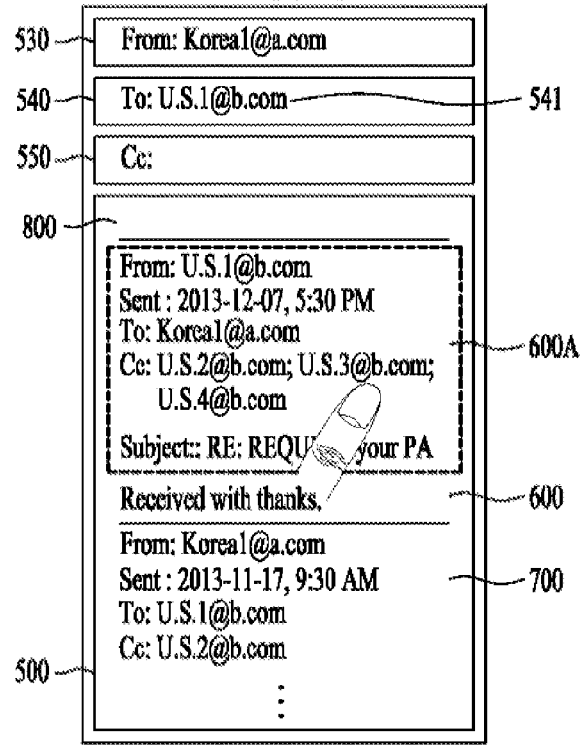
(a)
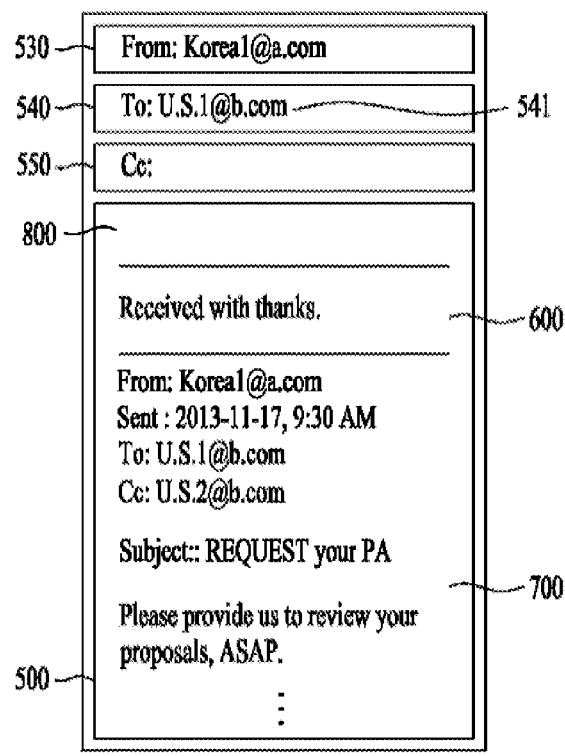
(b)

530 — From: Korea1@a.com
540 — To: U.S.1@b.com — 541
550 — Cc:
800 —

600 —
From: U.S.1@b.com
Sent : 2013-12-07, 5:30 PM
To: Korea1@a.com
Cc: U.S.2@b.com; U.S.3@b.com;
    U.S.4@b.com Subject:: RE: REQUEST your PA Received with thanks.

700 —
From: Korea1@a.com
Sent : 2013-11-17, 9:30 AM
To: U.S.1@b.com
Cc: U.S.2@b.com

500 —
⋮

(b)

530 — From: Korea1@a.com
540 — To: U.S.1@b.com — 541
550 — Cc:
800 —

From: Korea1@a.com
Sent : 2013-11-17, 9:30 AM
To: U.S.1@b.com
Cc: U.S.2@b.com

Subject:: REQUEST your PA

Please provide us to review your
proposals, ASAP.

530 — From: Korea1@a.com
540 — To: U.S.1@b.com — 541
550 — Cc:
800 —

From: U.S.1@b.com
Sent : 2013-12-07, 5:30 PM
To: Korea1@a.com
Cc: U.S.2@b.com; U.S.3@b.com;
U.S.4@b.com Subject:: RE: RE___ST your PA Received with th__ks.

From: Korea1@a.com
Sent : 2013-11-17, 9:30 AM
To: U.S.1@b.com
Cc: U.S.2@b.com

⋮

600
700
500

(b)

530 — From: Korea1@a.com
540 — To: U.S.1@b.com — 541
550 — Cc:
800 —
□ — 860

From: U.S.1@b.com
Sent : 2013-12-07, 5:30 PM
To: Korea1@a.com
Cc: U.S.2@b.com; U.S.3@b.com;
614 — U.S.4@b.com Subject:: RE: REQUEST your PA Received with thanks.   □ — 860

From: Korea1@a.com
Sent : 2013-11-17, 9:30 AM
To: U.S.1@b.com
Cc: U.S.2@b.com

⋮

600
700
500

FIG. 22
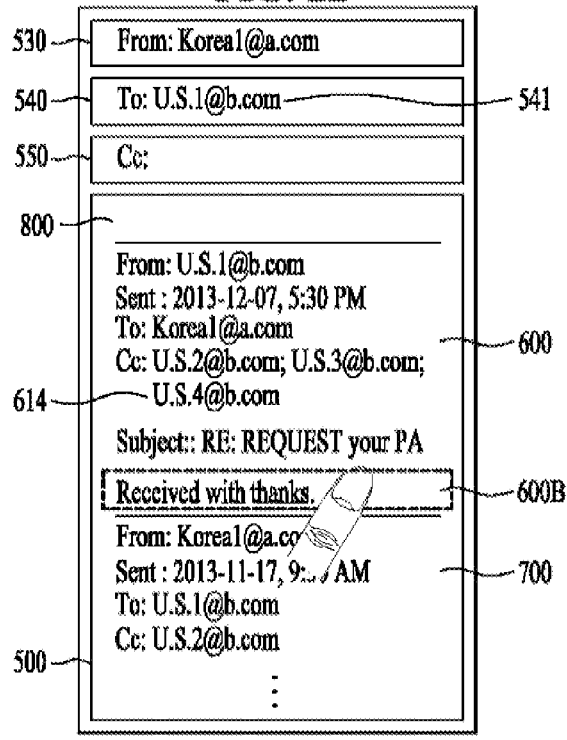
(a)
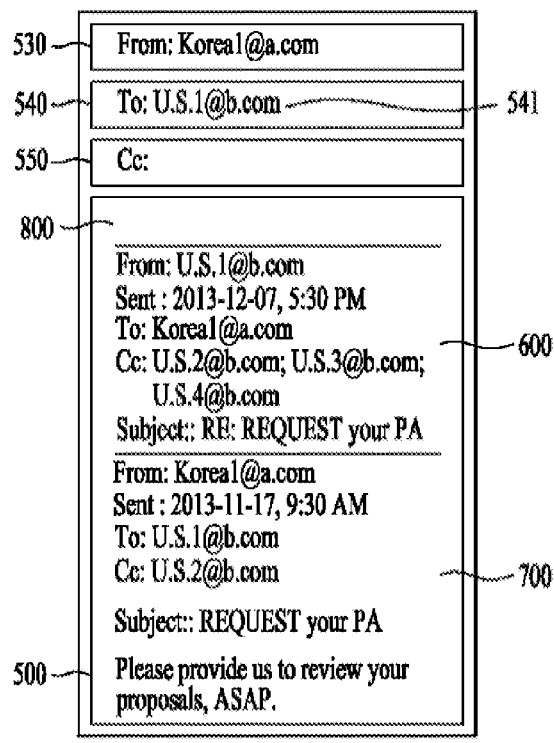
(b)

FIG. 23
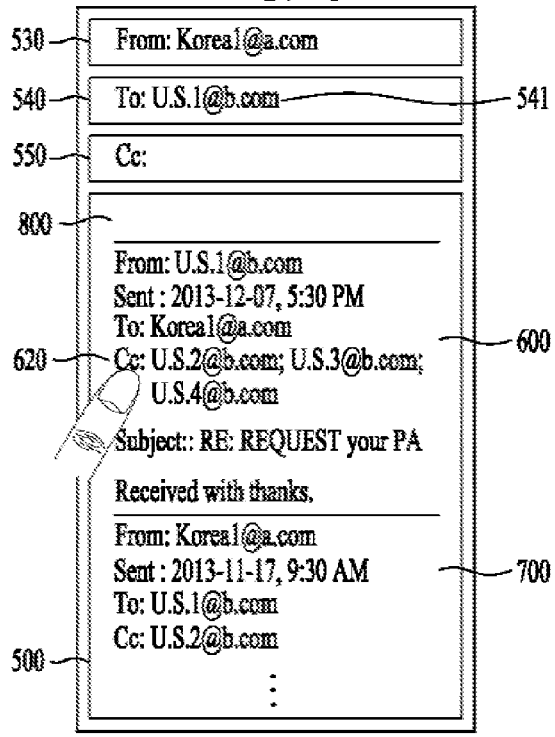
(a)
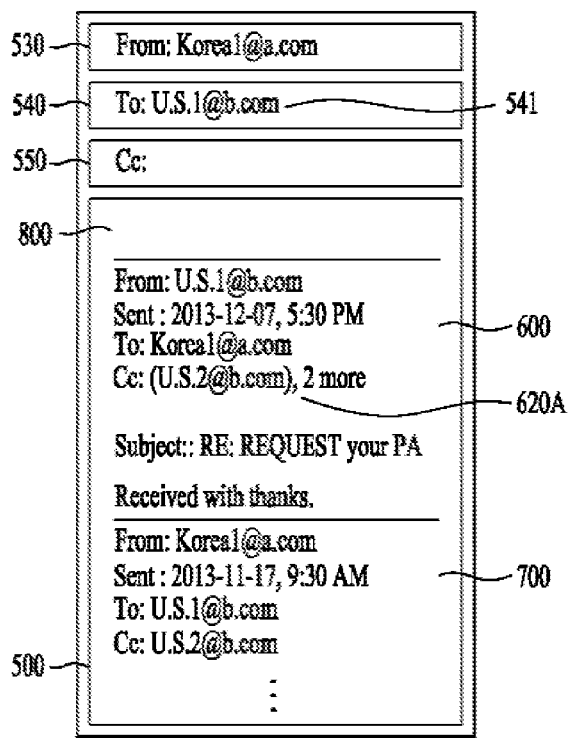
(b)

FIG. 24
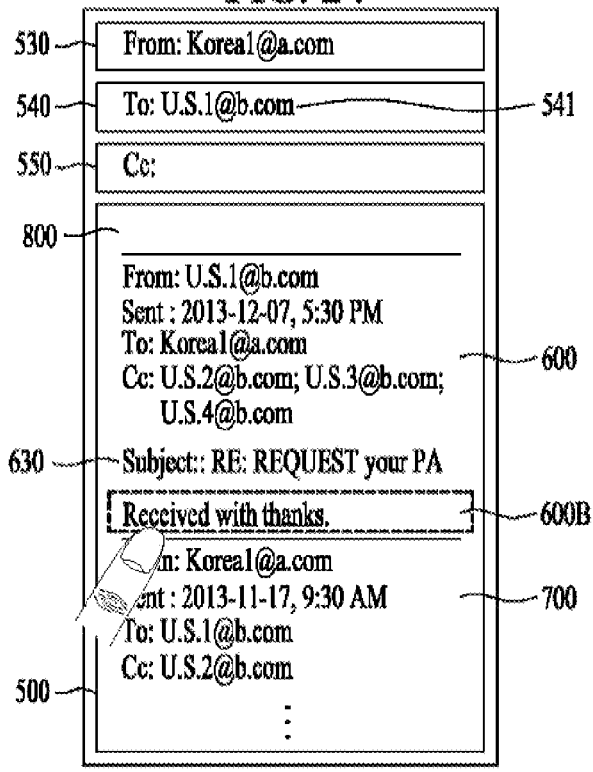
(a)
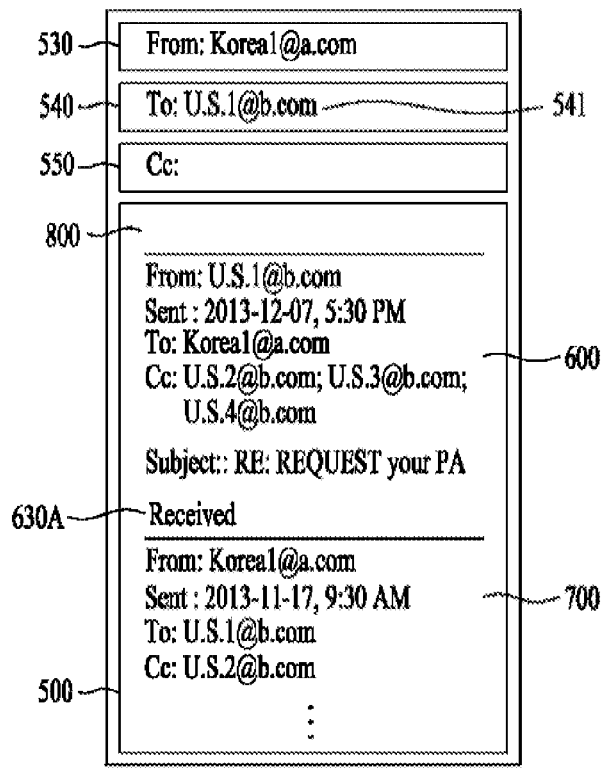
(b)

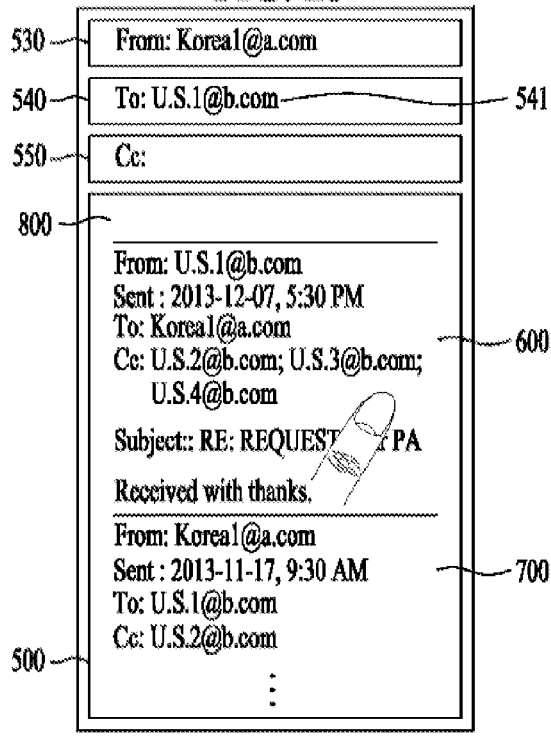
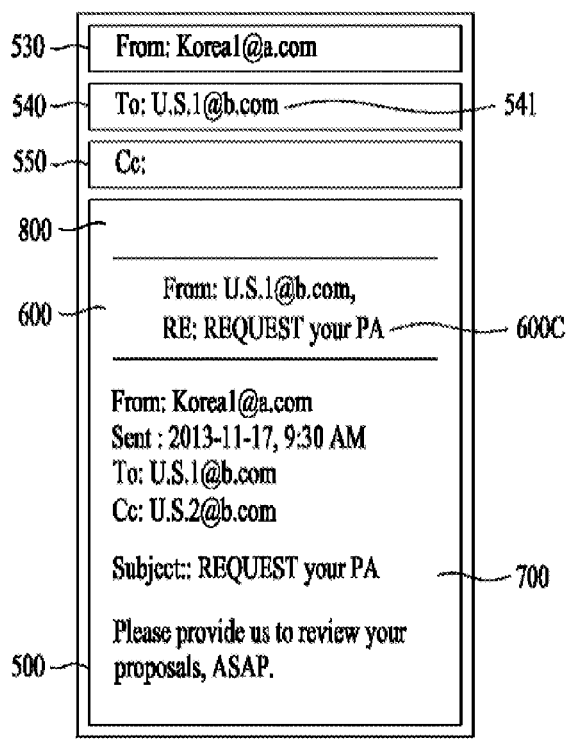

FIG. 26
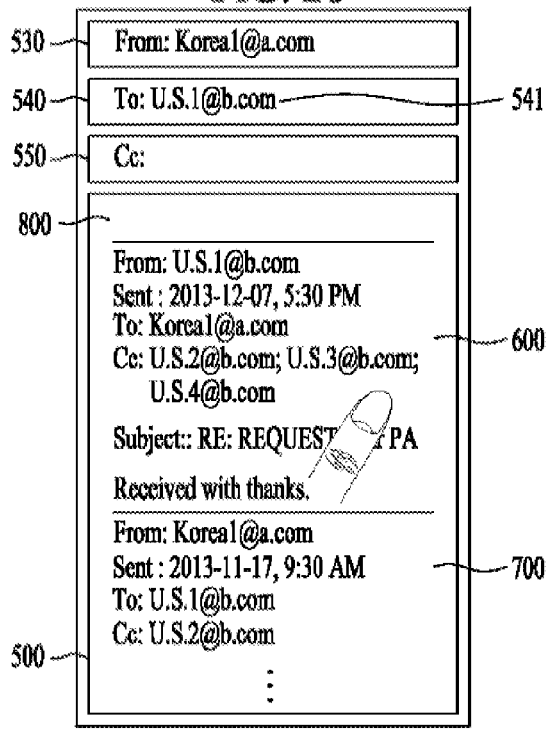
(a)
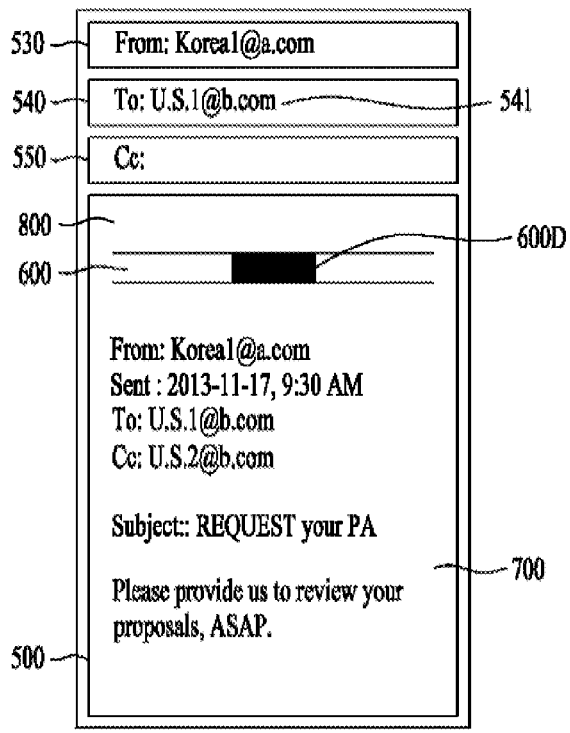
(b)

MOBILE TERMINAL AND CONTROLLING METHOD THEREOF

Pursuant to 35 U.S.C. §119(a), this application claims the benefit of earlier filing date and right of priority to Korean Application No.10-2014-0003746, filed on Jan. 13, 2014, the contents of which are hereby incorporated by reference herein in their entirety.

BACKGROUND OF THE INVENTION

Field of the Invention

The present invention relates to a mobile terminal, and more particularly, to a mobile terminal and a method of controlling the mobile terminal.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

The above-mentioned terminal exactly provides a mail service function provided by a PC in form of an application.

In particular, a user is able to transceive mails with a desired counterpart using a mail application of a terminal.

However, when a user sends a reply mail to a sender of a received mail in response to the received mail, it causes a problem that the user inconveniently inputs a mail address of a recipient or a mail address of a carbon copy as a text one by one in order to add a recipient of the reply mail or the carbon copy of the reply mail.

When a user forwards a reply mail to a different counterpart other than a sender of the received mail in repose to the received mail, it causes a problem that the user inconveniently inputs a mail address of the different counterpart as a text one by one.

When a user sends or forwards a reply mail in response to a received mail, it causes a problem that the user inconveniently specifies and deletes an undesired part in the reply mail one by one in order to delete a content of the undesired part.

When a user checks a content of a received mail, if numerous mail addresses of recipients and/or carbon copies are contained in the received mail, it causes a problem that the user needs to perform an unnecessary scroll action inconveniently in order to view an actual original text displayed region due to a display region occupied by the mail addresses within a mail display region on a screen.

If many original texts of mails transceived with a sender of a received mail are contained in the received mail, it causes a problem that a user needs to perform a number of scroll actions to view a desired original text in the received mail.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof as follows. First of all, when a command for replying or forwarding a previously received first mail is inputted, a window for composing a second mail containing the first mail is displayed. When at least one mail address information contained in at least one original text in the first mail is selected from the composing window, a mail address corresponding to the selected mail address information is automatically set as a reception or carbon copy mail address of the second mail.

Another object of the present invention is to provide a mobile terminal and controlling method thereof, by which desired mail address informations among mail address informations contained in a previously received first mail can be deleted from the first mail or displayed by being summarized.

Further object of the present invention is to provide a mobile terminal and controlling method thereof, by which at least one original text contained in a previously received first mail can be deleted from the first mail or displayed by being summarized.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a wireless communication unit configured to transceive mails, a touchscreen configured to display at least one first mail previously received through the wireless communication unit, and a controller, when a command for a reply or forwarding of the displayed first mail is inputted, displaying a composing window of a second mail including the first mail, the controller, when at least one mail address information included in at least one original text in the first mail is selected from the composing window, automatically setting a mail address corresponding to the selected mail address information as a recipient or carbon copy mail address of the second mail.

In another aspect of the present invention, a method of controlling a mobile terminal according to the present invention may include the steps of receiving at least one first mail, displaying the received first mail, when a command for a reply or forwarding of the displayed first mail is inputted, displaying a composing window of a second mail including the first mail, and when at least one mail address information included in at least one original text in the first mail is selected from the composing window, automatically setting a mail address matching the selected mail address information as a recipient or carbon copy mail address of the second mail.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIGS. 6 to 26 are diagrams to describe a method of controlling a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
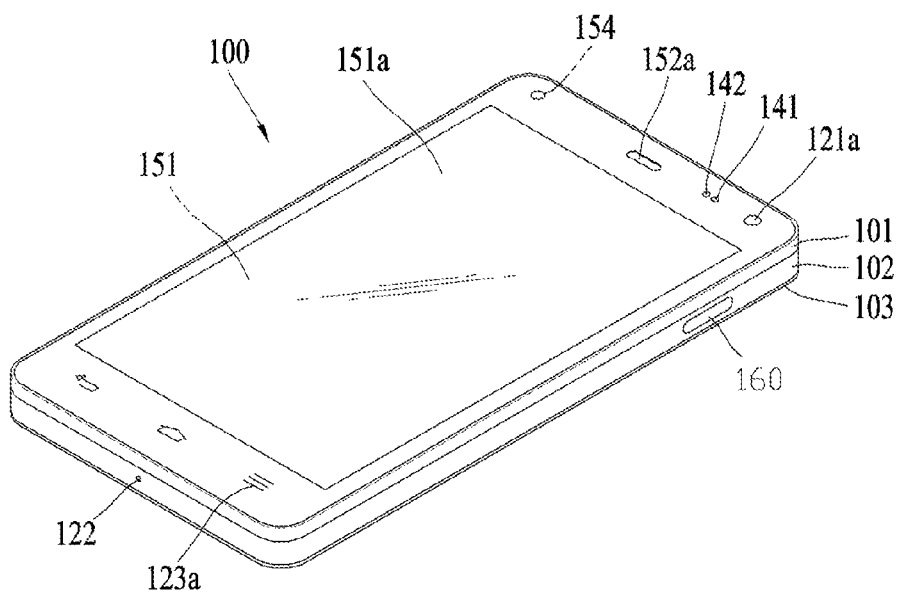
FIGS. 1B and 1C are conceptual views of one example of the mobile terminal, viewed from different directions.
Figure 1C:
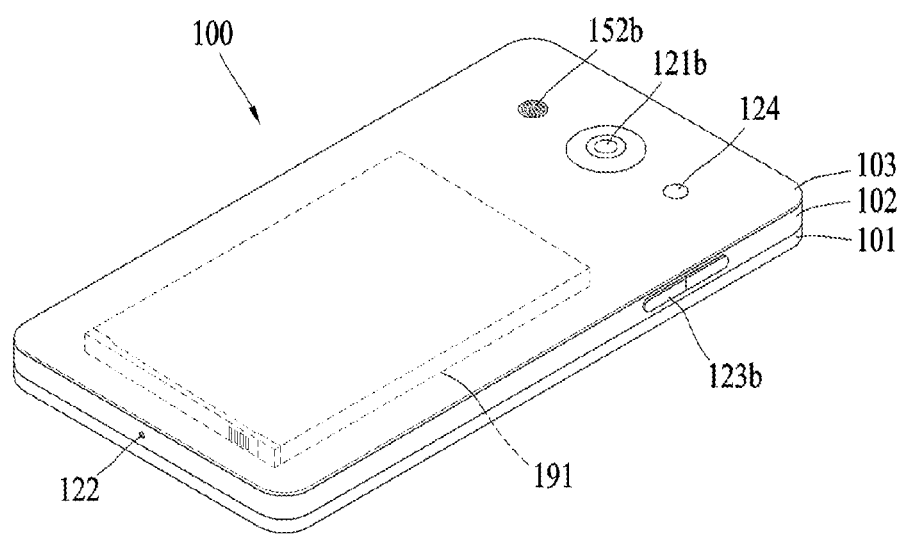

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
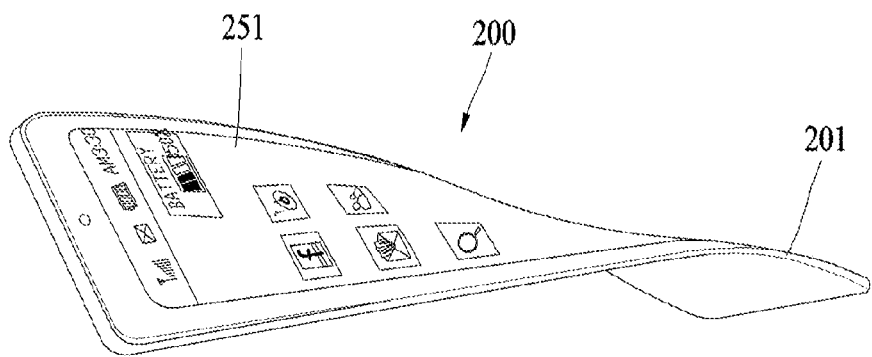
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
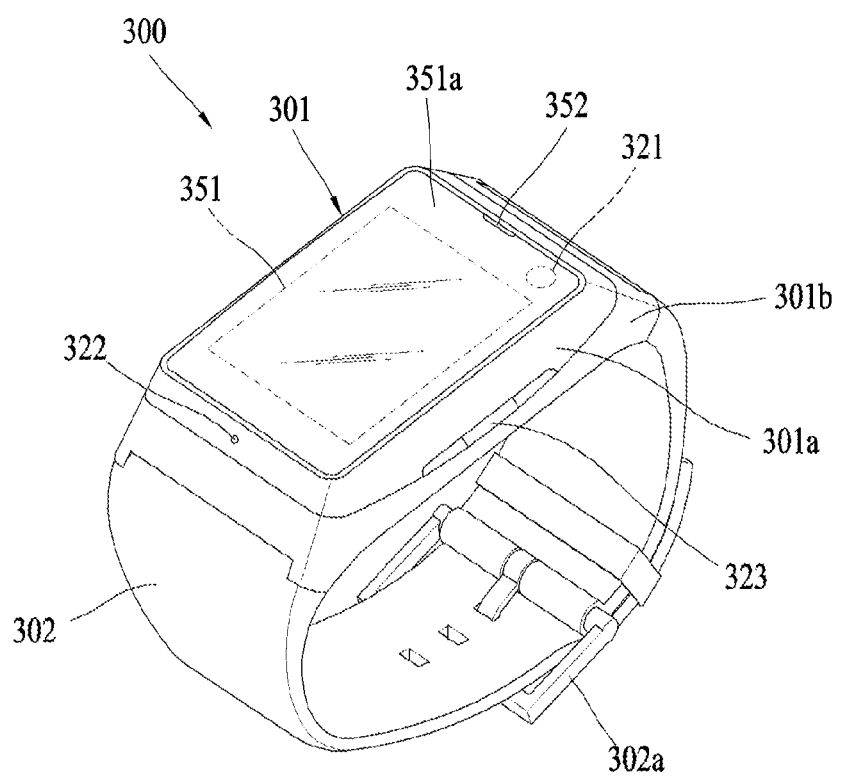
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
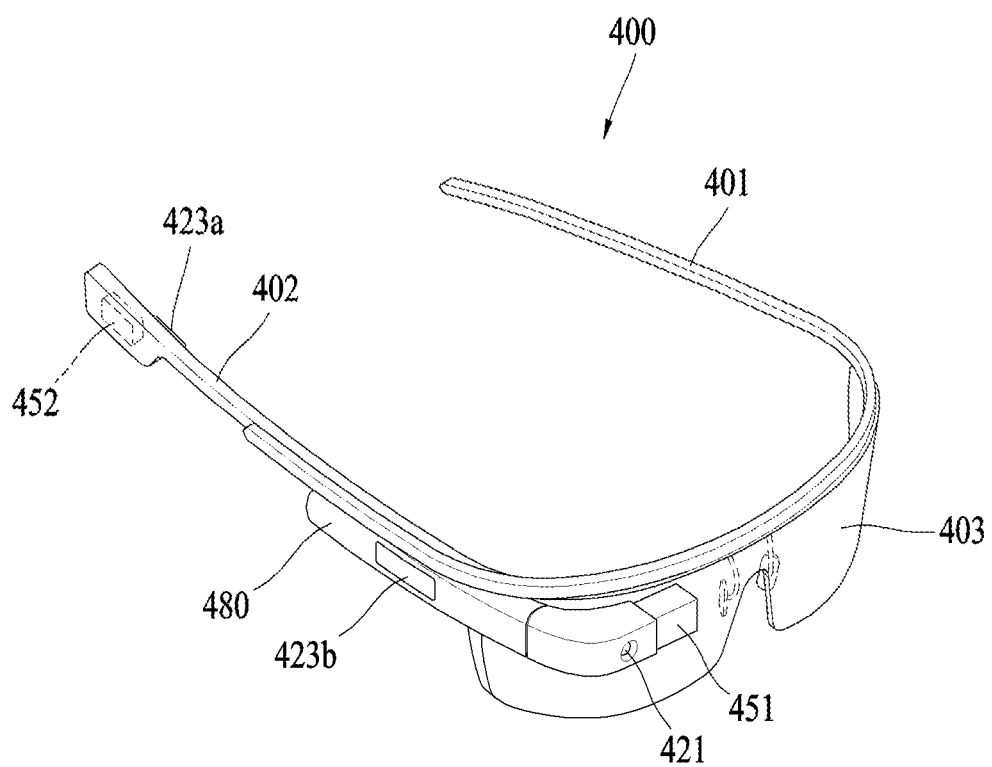
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

In the following description, embodiments related to a controlling method implemented in the above-configured mobile terminal are explained with reference to the accompanying drawings.

With reference to FIGS. 5 to 26, a process for setting a reception or carbon copy mail address of a $2^{nd}$ mail for replying or forwarding a previously received $1^{st}$ mail according to the present invention is described in detail as follows.

Figure 5:
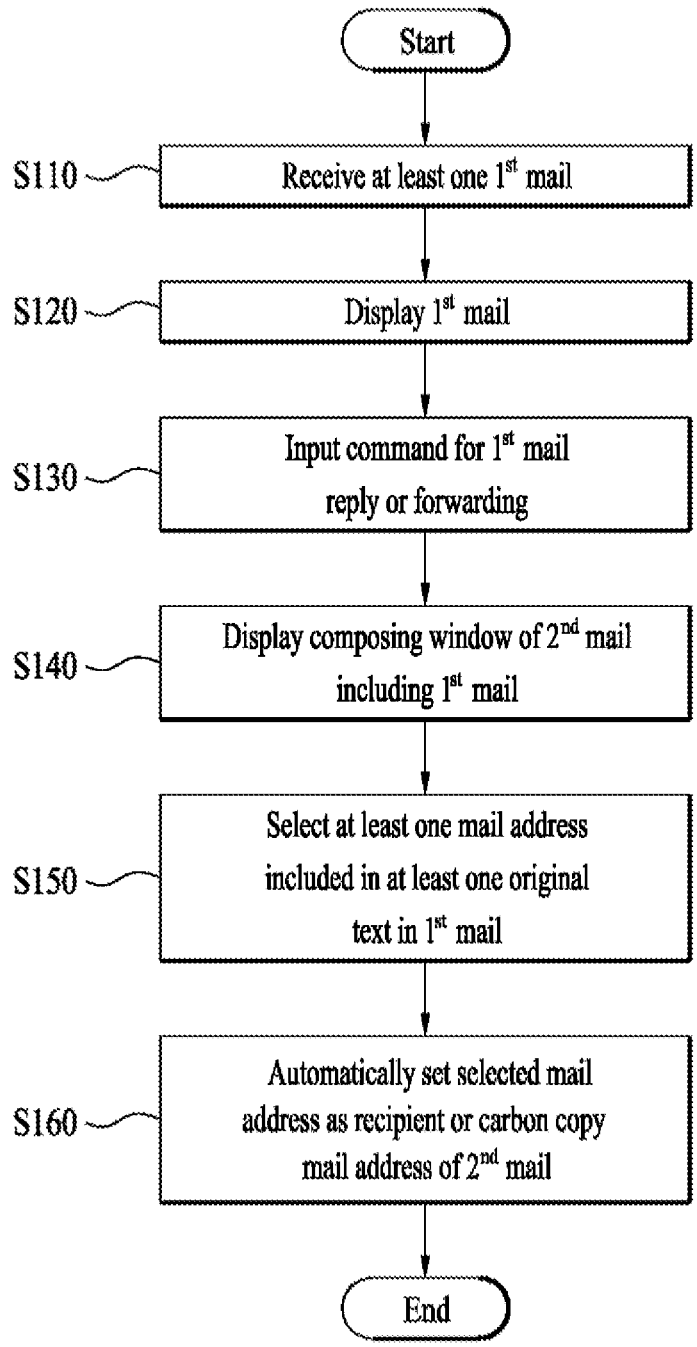
FIG. 5 is a flowchart for a method of controlling a mobile terminal according to one embodiment of the present invention.

FIG. 5 is a flowchart for a method of controlling a mobile terminal according to one embodiment of the present invention.

FIGS. 6 to 26 are diagrams to describe a method of controlling a mobile terminal according to one embodiment of the present invention.

Referring to FIGS. 5 to 26, if a $1^{st}$ mail 500 is received through the wireless communication unit 110 [S110], the controller 180 of the mobile terminal 100 controls the received $1^{st}$ mail 500 to be displayed on a screen of the touchscreen 151 [S120].

In this case, referring to FIG. 6, the $1^{st}$ mail includes at least one original text 600/700 having a header and a body.

In particular, the $2^{nd}$ original copy 700 contained in the $1^{st}$ mail is the original text of a mail sent to a sender (U.S.1@b.com) of the $1^{st}$ original text 600 by a user corresponding to a sender (Korea1@a.com) of the $2^{nd}$ original text 700. And, the $1^{st}$ original text 600 contained in the $1^{st}$ mail 500 can become an original text of a reply or forwarded mail for the $2^{nd}$ original text 700 sent by the user.

Each of the $1^{st}$ original text 600 and the $2^{nd}$ original text 700 includes a header region and a body region. In particular, the header region includes at least one of a mail address information of a mail sender, a mail address information of a mail recipient, a mail address information of a carbon copy recipient to receive a mail as a carbon copy, a mail sent time information, and a mail subject. And, the body region includes a text content of the mail. In this case, the mail address information can be configured in a manner that a corresponding mail address and a title determined by a sender or a recipient are combined together.

For instance, in the example shown in FIG. 6(a), a mail address information (Korea1@a.com) of a mail sender corresponding to the $1^{st}$ original text 700, a mail sent time information (2013-11-17, 9:30 AM), a mail address information (U.S.1@b.com) of a mail recipient, a mail address information (U.S.2@b.com) of a mail carbon copy recipient (Cc) and a mail subject (Subject: REQUEST your PA) are included in the header region of the $1^{st}$ original text 700.

In the example shown in FIG. 6(a), a text content ('please provide us . . . proposals, ASAP') of the $1^{st}$ original text 700 is included in the body region of the $1^{st}$ original text 700.

In the example shown in FIG. 6(a), a mail address information (U.S.1@b.com) of a mail sender corresponding to the $2^{nd}$ original text 600, a mail sent time information (2013-12-07, 5:30 PM), a mail address information (Korea1@a.com) of a mail recipient, a mail address information (U.S.2@b.com, U.S.3@b.com, U.S.4@b.com) of mail carbon copy recipients (Cc) and a mail subject (Subject: RE: REQUEST your PA) are included in the header region of the $2^{nd}$ original text 600 corresponding to a reply or forwarded mail of the $1^{st}$ original text 700.

In the example shown in FIG. 6(a), a text content (Received with thanks) of the $2^{nd}$ original text 600 is included in the body region of the $2^{nd}$ original text 600 corresponding to the reply or forwarded mail of the $1^{st}$ original text 700.

Subsequently, if a command for a reply or forwarding of the received $1^{st}$ mail is inputted through the touchscreen 151 or the user input unit 123 [S130], the controller 180 displays a composing window of a $2^{nd}$ mail containing all the original texts 600 and 700 included in the $1^{st}$ mail [S140].

Referring to FIG. 6(a), the controller 180 activates a mail application for providing a mail transceiving related function and then displays the $1^{st}$ mail on an active screen of the mail application. If a reply icon 510, to which a mail reply function provided by the mail application is assigned, or a forward icon 520 having a forwarding function assigned thereto is selected, referring to FIG. 6(b) and FIG. 6(c), the controller 180 can display a composing window of the $2^{nd}$ mail.

Referring to FIG. 6(b) and FIG. 6(c), the composing window 500 shows that the $1^{st}$ and $2^{nd}$ original texts 600 and 700 included in the $1^{st}$ mail and a text input region 800 for inputting a text of the $2^{nd}$ mail are included in the body region of the $2^{nd}$ mail. Moreover, the composing window 500 shows that a sender mail address setting region 530 of the $2^{nd}$ mail, a recipient mail address setting region 540 of the $2^{nd}$ mail and a carbon copy (Cc) mail address setting region 550 of the $2^{nd}$ mail are included in the header region of the $2^{nd}$ mail.

In doing so, referring to FIG. 6(b), if the reply icon 510 is selected, the controller 180 automatically sets a mail address 541 corresponding to a mail address information of a sender having sent the $1^{st}$ original text 600 in the recipient mail address setting region 540 of the composing window 500 of the $2^{nd}$ mail. Referring to FIG. 6(c), if the forward icon 520 is selected, the controller 180 displays the composing window 500 of the $2^{nd}$ mail only without automatically setting the mail address 541 of the sender having sent the $1^{st}$ original text 600 in the recipient mail address setting region 540 within the composing window 500 of the $2^{nd}$ mail.

Subsequently, if at least one mail address information included in at least one original text within the $1^{st}$ mail included in the composing window 500 is selected [S150], the controller 180 automatically sets a mail address corresponding to the selected mail address information as a reception or carbon copy mail address of the $2^{nd}$ mail [S160].

The process shown in FIG. 3 is described in detail with reference to FIGS. 7 to 26 as follows.

First of all, referring to FIG. 7, after one of the recipient mail address setting region 540 and the carbon copy mail address setting region 550 within the composing window 500 has been selected, if at least one mail address information included in at least one original text in the $1^{st}$ mail is selected, the controller 180 can set a mail address corresponding to the selected mail address information in the selected setting region 540 or 550.

For instance, if the carbon copy mail address setting region 550 in the composing window 500 is touched [FIG. 7(a)] and if at least one mail address information (U.S.4@b.com) included in the $1^{st}$ original text 600 within the $1^{st}$ mail is touched [FIG. 7(b)], the controller 180 can automatically set a mail address 614 corresponding to the touched mail address information (U.S.4@b.com) in the touched carbon copy mail address setting region 550 [FIG. 7(c)].

Thereafter, after the composition of the $2^{nd}$ mail has been completed through the composing window 500, if a command for a transmission of the $2^{nd}$ mail is inputted, the controller 180 sends the composed $2^{nd}$ mail to the recipient mail address 541 and the carbon copy mail address 614 through the wireless communication unit 110.

Meanwhile, referring to FIG. 8, while at least one mail address information included in at least one original text within the $1^{st}$ mail included in the composing window 500 is touched, if the touched mail address information is dragged & dropped onto one of the recipient mail address setting region 540 and the carbon copy mail address setting region 550, the controller 180 can automatically set a mail address corresponding to the dragged & dropped mail address information in one of the recipient mail address setting region 540 and the carbon copy mail address setting region 550, For instance, if at least one mail address information (U.S.4@b.com) included in the $1^{st}$ original text 600 in the $1^{st}$ mail included in the composing window 500 is touched and if the touched mail address information (U.S.4@b.com) is dragged & dropped onto the carbon copy mail address setting region 550 while touched [FIG. 8(a)], the controller 180 can automatically set a mail address 614 corresponding to the mail address information (U.S.4@b.com) in the carbon copy mail address setting region 550 [FIG. 8(b)].

Thereafter, after the composition of the $2^{nd}$ mail has been completed through the composing window 500, if a command for a transmission of the $2^{nd}$ mail is inputted, the controller 180 sends the composed $2^{nd}$ mail to the recipient mail address 541 and the carbon copy mail address 614 through the wireless communication unit 110.

Figure 9:
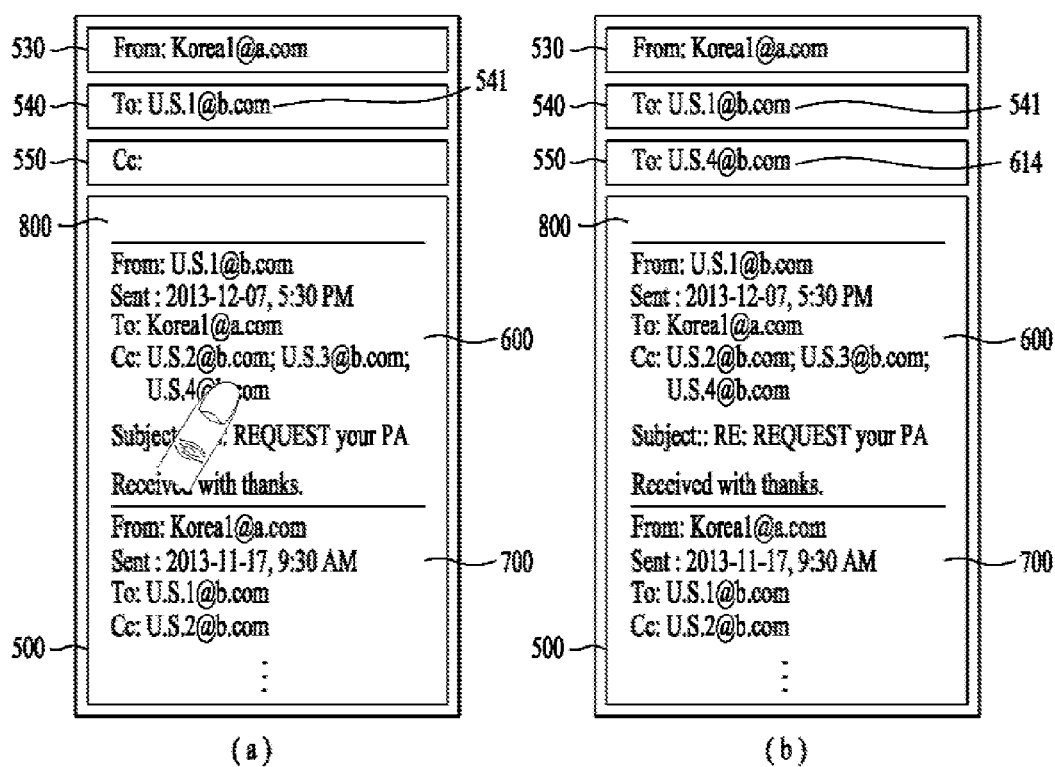

Meanwhile, referring to FIG. 9, if at least one mail address information touched in the $1^{st}$ mail included in the composing window 500 corresponds to a carbon copy mail address in the corresponding original text within the $1^{st}$ mail, the controller 180 can automatically set a mail address corresponding to the touched mail address information in the carbon copy mail address setting region 550 within the composing window 500.

For instance, if at least one mail address information (U.S.4@b.com) included in the $1^{st}$ original text 600 in the $1^{st}$ mail included in the composing window 500 is touched, referring to FIG. 9(a), the controller 180 checks whether the touched mail address information (U.S.4@b.com) is a carbon copy reception mail address in the $1^{st}$ original text 600.

In this case, if the touched mail address information (U.S.4@b.com) is not the carbon copy reception mail address but is a recipient mail address in the $1^{st}$ original text 600, the controller 180 can automatically set a mail address 614 corresponding to the touched mail address information (U.S.4@b.com) in the recipient mail address setting region 540 within the composing window 500.

If the touched mail address information (U.S.4@b.com) is not the user mail address (Korea 1@a.com) of the mobile terminal 100, the controller 180 can automatically set a mail address 614 corresponding to the touched mail address information (U.S.4@b.com) in the carbon copy mail address setting region 550 within the composing window 500.

If the touched mail address information (U.S.4@b.com) is the carbon copy reception address in the 1$^{st}$ original text 600, referring to FIG. 9(b), the controller 180 can automatically set a mail address 614 corresponding to the touched mail address information (U.S.4@b.com) in the carbon copy mail address setting region 550 within the composing window 500.

Meanwhile, referring to FIG. 10, once the composing window 500 is displayed, the controller 180 convers at least one mail address information included in the 1$^{st}$ mail to at least one touchable item and then displays the at least one touchable item at a location within a corresponding original text. If a prescribed one of the items is touched, the controller 180 can automatically set a mail address corresponding to the touched item as a reception or carbon copy mail address of the 2$^{nd}$ mail.

For instance, referring to FIG. 10(a), if the composing window 500 is displayed, the controller 180 converts all mail address informations included in the 1$^{st}$ mail within the composing window 500 to touchable items 611A, 612A, 613A, 614A, 711A and 712A and then displays the touchable items 611A, 612A, 613A, 614A, 711A and 712A.

In doing so, each of the items 611A, 612A, 613A, 614A, 711A and 712A can represent a whole body or portion of the corresponding mail address information. Each of the items 611A, 612A, 613A, 614A, 711A and 712A can be shifted or fixed to a prescribed location within the composing window 500 in response to a user's touch manipulation (e.g., a drag touch action, etc.) and is also able to change its own size in response to a user's touch manipulation (e.g., a pinch-in touch action, a pinch-out touch action, etc.).

After the composing window 500 has been displayed, the controller 180 does not convert all of the mail address informations to the corresponding items 611A, 612A, 613A, 614A, 711A and 712A. Instead, when a specific mail address information within the composing window 500 is touched by a preset action (e.g., a long-touch, etc.), the controller 180 can convert all of the mail address informations to the corresponding items 611A, 612A, 613A, 614A, 711A and 712A.

subsequently, if a prescribed one 612A of the items 611A, 612A, 613A, 614A, 711A and 712A is touched [FIG. 10(b)], the controller 180 can automatically set a mail address 612 corresponding to the mail address information corresponding to the touched item 612A in the recipient mail address setting region 540 or the carbon copy mail address setting region 550 [FIG. 10(c)].

In doing so, like the example shown in FIG. 7, before the item 612A is touched, if one of the recipient mail address setting region 540 and the carbon copy mail address setting region 550 is preferentially selected by being touched and the item 612A is then touched, the controller 180 can automatically set the mail address 612 corresponding to the item 612A in the selected setting region 540 or 550.

Like the example shown in FIG. 8, after the item 612A has been touched, if the touched item 612A is dragged & dropped onto one of the recipient mail address setting region 540 and the carbon copy mail address setting region 550, the controller 180 can automatically set a mail address corresponding to the dragged & dropped item 612A in one of the recipient mail address setting region 540 and the carbon copy mail address setting region 550.

Like the example shown in FIG. 9, if a mail address corresponding to the touched item 612A corresponds to a recipient mail address within the corresponding original text 600, the controller 180 can automatically set the mail address 612 corresponding to the touched item 612A in the recipient mail address setting region 540.

If the touched item 612A matches a carbon copy mail address in the corresponding original text 600, the controller 180 can automatically set the mail address 612 corresponding to the touched item 612A in the carbon copy mail address setting region 550.

Meanwhile, referring to FIG. 11, the controller 180 displays a list including at least one mail address information included in the 1$^{st}$ mail within the composing window 500 and is then able to automatically set at least one mail address corresponding to at least one mail address information selected from the list in the recipient mail address setting region 540 and the carbon copy mail address setting region 550.

First of all, referring to FIG. 11(a), once the composing window 500 is displayed, the controller 180 obtains all mail address informations included in the original texts 600 and 700 within the 1$^{st}$ mail and then displays a list 810 including mail address informations 611, 612, 613 and 614 on the composing window 500 by excluding the duplication among the obtained mail address informations.

In doing so, after the composing window 500 has been displayed, if a specific mail address information included in the 1$^{st}$ mail is touched by a preset action (e.g., a long-touch, etc.), the controller 180 obtains all mail address informations included in the original texts 600 and 700 within the 1$^{st}$ mail and is then able to display the list 810 including the mail address informations 611, 612, 613 and 614 by excluding the duplication among the obtained mail address informations.

Secondly, referring to FIG. 11(b), once the composing window 500 is displayed, the controller 180 partitions a display region of the composing window 500 into at least two regions including a 1$^{st}$ region 500A and a 2$^{nd}$ region 500B. Subsequently, the controller 180 displays the original texts 600 and 700 included in the 1$^{st}$ mail and a text input region 800 of the 2$^{nd}$ mail on the 1$^{st}$ region 500A and also displays the list 810 on the 2$^{nd}$ region 500B.

In doing so, the controller 180 can control the mail address informations 611, 612, 613 and 614 included in the list 810 to be displayed in a manner of being sorted by preset priorities.

For instance, the priority may include a mail transceived frequency order. In this case, the controller 180 obtains a frequency of transceiving mails between a user of the mobile terminal 100 and a mail address corresponding to each of the mail address informations 611, 612, 613 and 614 included in the list 810 and is then able to control the mail address informations 611, 612, 613 and 614 to be displayed on the list 810 in a manner of being sorted in higher order of the obtained frequency.

For another instance, the priority may include a significance order set for each of the mail address informations 611, 612, 613 and 614 by a user through the mail application. And, the controller 180 is then able to control the mail address informations 611, 612, 613 and 614 to be displayed on the list 810 in a manner of being sorted in higher significance order of the mail address informations 611, 612, 613 and 614 included in the list 810.

For further instance, the priority may include an order of a count of inclusions in the 1$^{st}$ mail. And, the controller 180 is then able to control the mail address informations 611, 612, 613 and 614 to be displayed on the list 810 in a manner of being sorted in higher count of inclusions in the 1$^{st}$ mail for the mail address informations 611, 612, 613 and 614 included in the list 810.

On the other hand, after the composing window 500 has been displayed, if a specific mail address information included in the 1$^{st}$ mail is touched by a preset action (e.g., a long-touch, etc.), the controller 180 partitions a display region of the composing window 500 into at least two regions including a 1$^{st}$ region 500A and a 2$^{nd}$ region 500B. Subsequently, the controller 180 displays the original texts 600 and 700 included in the 1$^{st}$ mail and a text input region 800 of the 2$^{nd}$ mail on the 1$^{st}$ region 500A and also displays the list 810 on the 2$^{nd}$ region 500B.

After at least one mail address information has been selected from the list 810, if one of the recipient mail address setting region 540 and the carbon copy mail address setting region 550 is selected, the controller 180 can automatically set a mail address corresponding to the selected mail address information in the selected setting region 540 or 550.

If at least one mail address information is touched in the list 810 and is then dragged & dropped onto one of the recipient mail address setting region 540 and the carbon copy mail address setting region 550, the controller 180 can automatically set a mail address matching the dragged & dropped mail address information in one of the recipient mail address setting region 540 and the carbon copy mail address setting region 550.

If at least one mail address information is selected from the list 810 and the selected mail address information matches a recipient mail address within the corresponding original text 600 or 700, the controller 180 can automatically set a mail address corresponding to the selected mail address information in the recipient mail address setting region 540.

If at least one mail address information is selected from the list 810 and the selected mail address information matches a carbon copy mail address in the corresponding original text 600 or 700, the controller 180 can automatically set a mail address corresponding to the selected mail address information in the carbon copy mail address setting region 550.

Figure 12:
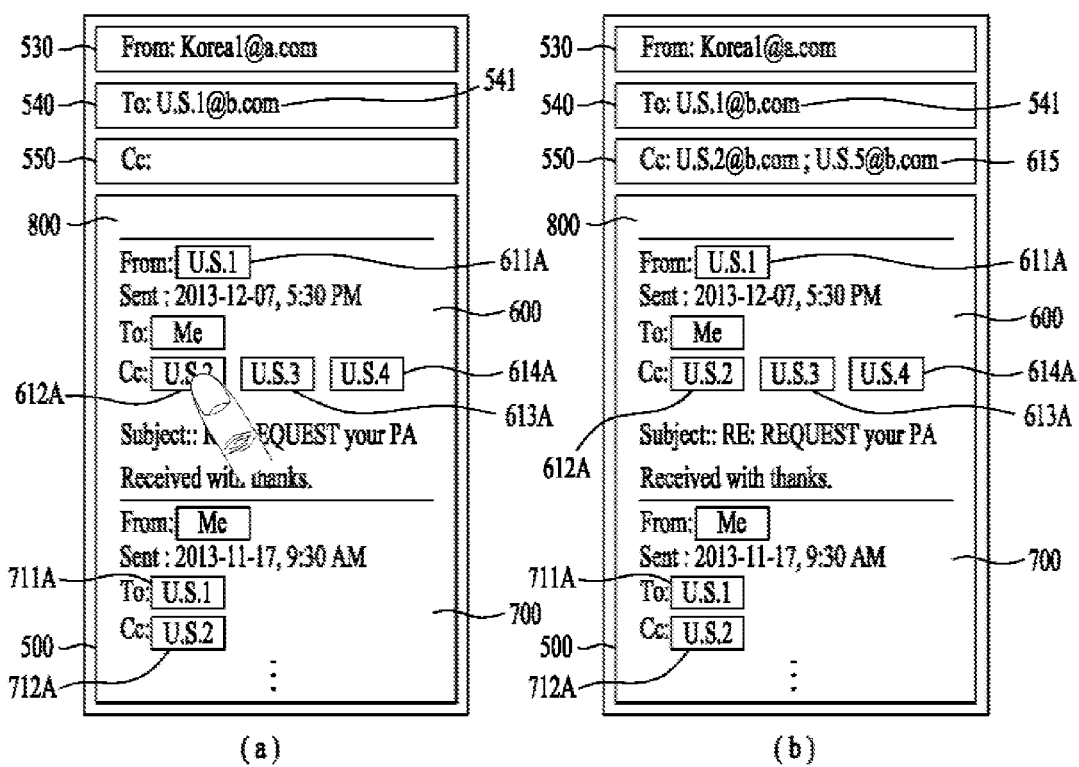
Figure 13:
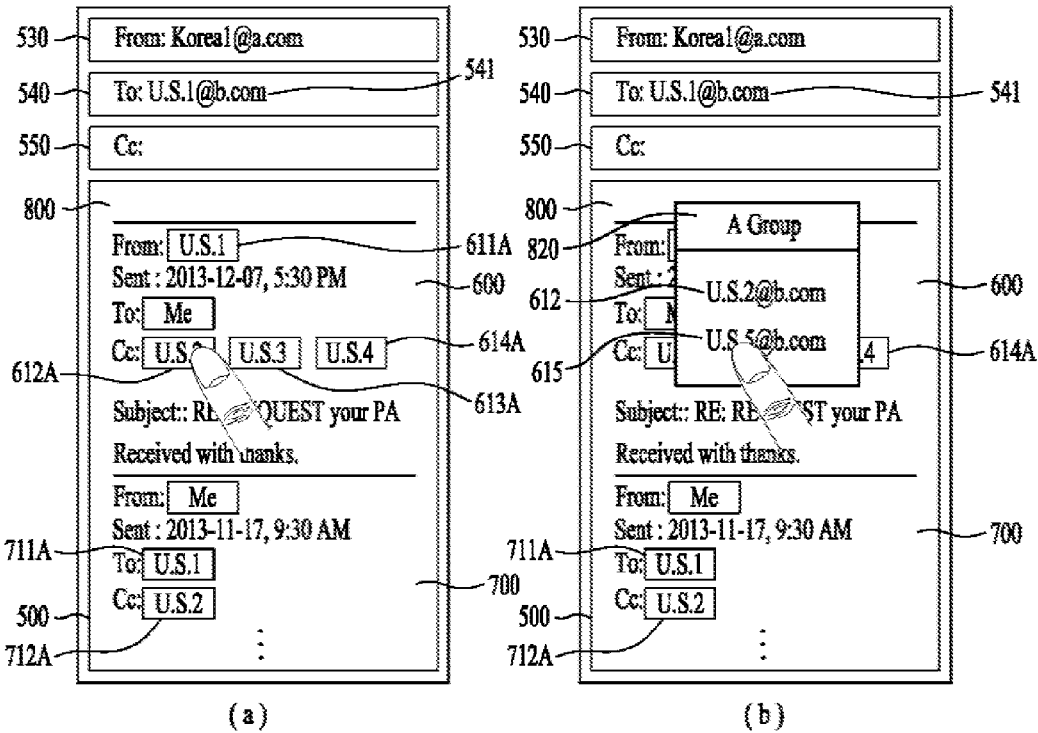

Meanwhile, referring to FIG. 12 and FIG. 13, while at least one group including at least one mail address information is configured and saved in the memory 170, if a mail address information selected from the 1$^{st}$ mail within the composing window 500 belongs to the group saved in the memory 170, the controller can automatically set at least one mail address corresponding to the at least one mail address information included in the group in the recipient mail address setting region 540 or the carbon copy mail address setting region 550.

First of all, for instance, referring to FIG. 12(a), if at least one item 612A in the 1$^{st}$ original text 600 within the 1$^{st}$ mail is touched, the controller 180 determines whether a group to which a mail address information corresponding to the touched item 612A belongs exists in the memory 170.

If the group to which the mail address information corresponding to the touched item 612A belongs exists in the memory 170, referring to FIG. 12(b), the controller 180 can automatically set mail addresses corresponding to all mail address informations included in the group in the recipient mail address setting region 540 or the carbon copy mail address setting region 550.

For example, referring to FIG. 12(b), 'U.S.1@b.com' 612 and 'U.S.5@b.com' 615 belong to the group. And, the 'U.S.1@b.com' 612 and 'U.S.5@b.com' 615 belonging to the group are automatically set in the carbon copy mail address setting region 550 by the controller 180.

Referring to FIG. 13, after at least one item 612A in the 1$^{st}$ original text 600 within the 1$^{st}$ mail has been touched, if a group to which a mail address information corresponding to the touched item 612A belongs exists in the memory 170 [FIG. 13(a)], the controller 180 displays a list 820 of all mail address informations 612 and 615 included in the group on the composing window 500 [FIG. 13(b)].

If a specific mail address information 615 is selected from the list 820, referring to FIG. 13(c), the controller 180 can automatically set a mail address corresponding to the selected mail address information 615 in the recipient mail address setting region 540 or the carbon copy mail address setting region 550.

For example, referring to FIG. 13(c), the mail address corresponding to the mail address information selected from the list 820 is automatically set in the carbon copy mail address setting region 550.

Figure 14:
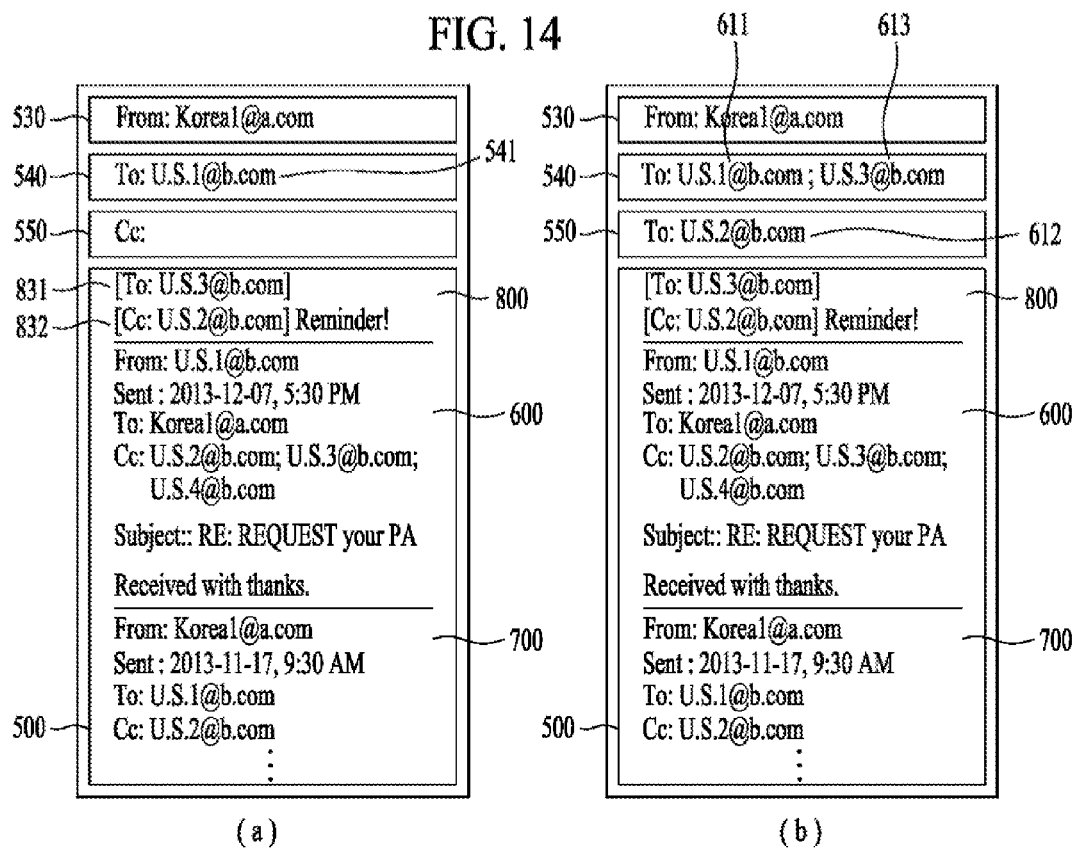

Meanwhile, referring to FIG. 14, if a text content is inputted to a text input region 800, to which a text of the 2$^{nd}$ mail is inputted, within the composing window 500 by a user and if an association information associated with at least one mail address information included in the 1$^{st}$ mail is included in the inputted text content, the controller 180 can automatically set a mail address corresponding to the association information in the recipient mail address setting region 540 or the carbon copy mail address setting region 550.

In this case, the association information may include a portion or whole part of the corresponding mail address and a location information indicating a setup location 540 or 550 of the corresponding mail address.

In particular, referring to FIG. 14, a user is able to directly input a recipient mail address or a carbon copy mail address into the text input region 800. In more particular, if a location information indicating a portion of a 1$^{st}$ mail address and a setup location 540 or 550 of the 1$^{st}$ mail address is included between a preset symbol ([ ]) by a user, the controller 180 determines a mail address information containing a portion of the 1$^{st}$ mail address or a mail address information identical to the 1$^{st}$ mail address among all mail address informations included in the 1$^{st}$ mail and is then able to automatically set a mail address corresponding to the determined mail address information in the setting region 540 or 550 corresponding to the location information.

For instance, if "[To: U.S.3@b.com]" 831 and "[Cc: U.S.2@b.com]" 832 are included in the text input region 800 [FIG. 14(a)], the controller 180 automatically sets 'U.S.3@b.com' 613 corresponding to the "[To: U.S.3@b.com]" 831 among the mail address informations included in the 1$^{st}$ mail in the recipient mail address setting region 540. And, the controller 180 automatically sets 'U.S.2@b.com' 612 corresponding to the "[Cc: U.S.2@b.com]"832 among the mail address informations included in the 1$^{st}$ mail in the carbon copy mail address setting region 550.

Meanwhile, referring to FIGS. 15 to 22, the controller 180 can delete a partial content of a 1$^{st}$ mail included in a composing window 500.

First of all, referring to FIG. 15, if at least one mail address information included in the 1$^{st}$ mail within the composing window 500 is selected, the controller 180 can delete the selected mail address information from the 1$^{st}$ mail.

For instance, if a specific mail address information 614 within the 1$^{st}$ original text 600 among the original texts 600 and 700 included in the 1$^{st}$ mail within the composing window 500 is selected by a preset action (e.g., a long-touch) [FIG. 15(a)], the controller 180 can delete the mail address information 614 touched by the preset action from the 1$^{st}$ original text 600 [FIG. 15(b)].

Referring to FIG. 16, if at least one mail address information included in the 1st mail within the composing window 500 is selected, the controller 180 displays a UI (user interface) for selecting each of all mail address informations included in the 1st mail and is then able to delete at least one mail address information selected through the UI from the 1st mail.

For instance, if a specific mail address information 614 within the 1st original text 600 among the original texts 600 and 700 included in the 1st mail within the composing window 500 is selected by a preset action (e.g., a long-touch) [FIG. 16(a)], the controller 180 displays check boxes 840 for selecting all mail address informations included in the 1st mail around all of the mail address informations, respectively [FIG. 16(b)].

If at least one mail address information to be deleted from the 1st mail is checked through the corresponding check box 840, the controller 180 can delete the checked at least one mail address information from the 1st mail.

Referring to FIG. 17, if a carbon copy region 620 in a header region of a 1st original text 600 among original texts in a 1st mail is touched by a preset action (e.g., a long-touch, etc.) [FIG. 17(a)], the controller 180 can delete at least one mail address information ("U.S.2@b.com", U.S.3@b.com, "U.S.4@b.com") included in the carbon copy region 620 within the 1st original text 600 from the 1st original text 600 [FIG. 17(b)].

Referring to FIG. 18, if a carbon copy region 620 in a header region of a 1st original text 600 among original texts in a 1st mail is touched by a preset action (e.g., a long-touch, etc.) [FIG. 18(a)], the controller 180 displays check boxes 850 for selecting all mail address informations ("U.S.2@b.com", U.S.3@b.com, "U.S.4@b.com") included in the carbon copy region 620 within the 1st original text 600 around all of the mail address informations ("U.S.2@b.com", U.S.3@b.com, "U.S.4@b.com"), respectively [FIG. 18(b)].

If at least one mail address information to be deleted from the carbon copy region 620 is checked through the corresponding check box 850, the controller 180 can delete the checked at least one mail address information from the carbon copy region 620.

Referring to FIG. 19, if a header region 600A of a 1st original text 600 among original texts in a 1st mail is touched by a preset action (e.g., a long-touch, etc.) [FIG. 19(a)], the controller 180 can delete the header region 600A from the 1st original text 600 [FIG. 19(b)].

Referring to FIG. 20, if a 1st original text 600 among original texts in a 1st mail is touched by a preset action (e.g., a long-touch, etc.) [FIG. 20(a)], the controller 180 can delete the 1st original text 600 from the 1st mail [FIG. 20(b)].

Referring to FIG. 21, if a 1st original text 600 among original texts in a 1st mail is touched by a preset action (e.g., a long-touch, etc.) [FIG. 21(a)], the controller 180 displays check boxes 860 for selecting all original texts 600 and 700 included in the 1st mail around the original texts 600 and 700, respectively [FIG. 21(b)].

If at least one original text to be deleted from the 1st mail is checked through the corresponding check box 850, the controller 180 can delete the checked at least one original text from the 1st mail.

Referring to FIG. 22, if a text region 600B of a 1st original text 600 among original texts in a 1st mail is touched by a preset action (e.g., a long-touch, etc.) [FIG. 22(a)], the controller 180 can delete the text region 600B from the 1st original text 600 [FIG. 22(b)].

Meanwhile, referring to FIGS. 23 to 26, the controller can summarize and display a partial content of a 1st mail included in a composing window 500.

First of all, referring to FIG. 23, if a carbon copy region 620 in a header region of a 1st original text 600 among original texts in the 1st mail included in the composing window 500 is touched by a preset action (e.g., a long-touch, etc.) [FIG. 23(a)], the controller 180 creates a summary information 620A created from summarizing all mail address informations ("U.S.2@b.com", U.S.3@b.com, "U.S.4@b.com") included in the carbon copy region 620 within the 1st original text 600 and is then able to display the created summary information 620A on the carbon copy region 620 instead of all mail address informations ("U.S.2@b.com", U.S.3@b.com, "U.S.4@b.com") included in the carbon copy region 620 [FIG. 23(b)].

In this case, the summary information 620A can include an information indicating the total number of all mail address informations ("U.S.2@b.com", U.S.3@b.com, "U.S.4@b.com"). And, the summary information 620A may include an information indicating the number of the residual mail address informations among all mail address informations ("U.S.2@b.com", U.S.3@b.com, "U.S.4@b.com") except the mail address information (U.S.2@b.com) set as a carbon copy in the first place.

While the summary information 620A is displayed on the carbon copy region 620, if the summary information 620A is touched by the preset action (e.g., a long-touch, etc.) again, the controller 180 can display all mail address informations ("U.S.2@b.com", U.S.3@b.com, "U.S.4@b.com") on the carbon copy region 620 instead of the summary information 620A again.

Referring to FIG. 24, if a text region 600B of a 1st original text 600 among original texts in the 1st mail included in the composing window 500 is touched by a preset action (e.g., a long-touch, etc.) [FIG. 24(a)], the controller 180 creates a summary information 630A created from summarizing a text content ('Received with thanks') displayed on the text region 600B and is then able to display the created summary information 630A on the text region 600B instead of the text content [FIG. 24(b)].

In this case, the summary information 630A may be configured in a manner of including at least one of a partial content of the text content, an image included in the text content, a dominant text in the text content, a 1st sentence of the text content, and a partial word in the 1st sentence.

While the summary information 630A is displayed on the text region 630, if the summary information 630A is touched by the preset action (e.g., a long-touch, etc.) again, the controller 180 can display the text content (Received with thanks') on the text region 630 instead of the summary information 630A again.

Referring to FIG. 25, if a 1st original text 600 among original texts in the 1st mail included in the composing window 500 is touched by a preset action (e.g., a long-touch, etc.) [FIG. 25(a)], the controller 180 creates a summary information 600C created from summarizing the 1st original text 600 and is then able to display the created summary information 600C within the 1st mail instead of the 1st original text 600 [FIG. 25(b)].

In this case, the summary information 600C may be configured in a manner of including at least one of a partial content of contents of the 1st original text 600, an image included in the contents of the 1st original text 600, a dominant text in the contents of the 1st original text 600, a 1st sentence in the contents of the 1st original text 600, a partial word in the 1st sentence, a title of the contents of the $1^{st}$ original text 600, a sender mail address information of the $1^{st}$ original text 600 and the like.

While the summary information 600C is displayed within the $1^{st}$ mail instead of the $1^{st}$ original text 600, if the summary information 600C is touched by the preset action (e.g., a long-touch, etc.) again, the controller 180 can display the $1^{st}$ original text 600 within the $1^{st}$ mail again instead of the summary information 600C.

Finally, referring to FIG. 26, if a $1^{st}$ original text 600 among original texts in the $1^{st}$ mail included in the composing window 500 is touched by a preset action (e.g., a long-touch, etc.) [FIG. 26(*a*)], the controller 180 hides the $1^{st}$ original text 600 in the $1^{st}$ mail and displays an item 600D, to which a function of displaying the hidden $1^{st}$ original text 600 within the $1^{st}$ mail again is assigned, on the region having the $1^{st}$ original text 600 previously displayed thereon within the $1^{st}$ mail [FIG. 26(*b*)].

If the item 600D is selected, the controller controls the $1^{st}$ original text 600 to be displayed again on the region, on which the $1^{st}$ original text 600 was displayed, within the $1^{st}$ mail.

Accordingly, embodiments of the present invention provide various effects and/or features.

According to at least one of embodiments of the present invention, when a mail address of a recipient or carbon copy of a replied or forwarded mail for a received mail, the mail address can be conveniently set using a mail address information included in the received mail.

According to at least one of embodiments of the present invention, when a replied or forwarded mail for a received mail is composed, a content of an undesired part in a content of the received mail included in the replied or forwarded mail can be deleted conveniently and simply.

According to at least one of embodiments of the present invention, when a content of a received mail is checked, an original text or mail address informations contained in the received mail are displayed by being summarized, whereby a user can quickly check all contents of the received mail with the small number of scroll actions.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a wireless communication unit configured to transceive mails;
   a touchscreen configured to display a first mail previously received via the wireless communication unit; and
   a controller configured to:
   when a command for a reply or forwarding of the first mail is inputted, control the touchscreen to display a composing window of a second mail including the first mail; and
   when at least one mail address information included in at least one original text in the first mail is selected from the composing window, automatically set a mail address corresponding to the selected mail address information as a recipient address or carbon copy mail address of the second mail,
   wherein:
   the composing window includes a first setting region for a recipient mail address setting and a second setting region for a carbon copy mail address setting, and
   the controller is further configured to:
   determine whether the mail address corresponding to the selected mail address information is a carbon copy mail address or a recipient mail address in a corresponding original text within the first mail;
   when the determined mail address is not the carbon copy mail address but is the recipient mail address in the corresponding original text, automatically set the determined mail address in the first setting region; and
   when the determined mail address is not the recipient mail address but is the carbon copy mail address in the corresponding original text, automatically set the determined mail address in the second setting region.

2. The mobile terminal of claim 1, wherein the mail address information comprises at least one of at least one sender mail address information, at least one recipient mail address information, or at least one carbon copy mail address information.

3. The mobile terminal of claim 1, wherein when one of the first and second setting regions is selected and the mail address information is selected, the controller sets the mail address corresponding to the selected mail address information in the selected setting region.

4. The mobile terminal of claim 1, wherein while the mail address information is touched, when the touched mail address information is dragged and dropped onto one of the first and second setting regions, the controller sets the mail address corresponding to the mail address information in the one of the first and second setting regions onto which the touched mail address is dragged and dropped.

5. The mobile terminal of claim 1, wherein when the determined mail address is not a mail address a user of the mobile terminal, the controller automatically sets the determined mail address as the carbon copy mail address.

6. The mobile terminal of claim 1, wherein when the composing window is displayed, the controller converts at least one mail address information included in the first mail to at least one touchable item and displays the at least one touchable item at a location within a corresponding original text and wherein when the item is touched, the controller automatically sets a mail address corresponding to the touched item as the recipient or carbon copy mail address of the second mail.

7. The mobile terminal of claim 1, wherein the controller displays a list including the at least one mail address information within the composing window and automatically sets at least one mail address corresponding to the at least one mail address information selected from the list as the recipient or carbon copy mail address of the second mail.

8. The mobile terminal of claim 7, wherein when at least two mail address informations are included in the list, the controller controls the at least two mail address informations to be displayed within the list in a manner of being sorted by a preset priority.

9. The mobile terminal of claim 7, wherein the controller partitions a display region of the composing window into at least two regions including a first region and a second region, displays the composing window on the first region, and displays the list of the second region.

10. The mobile terminal of claim 1, further comprising:
a memory configured to store at least one group including at least one mail address information,
wherein when the selected mail address information belongs to the group, the controller automatically sets at least one mail address corresponding to the at least one mail address information included in the group as the recipient or carbon copy mail address of the second mail.

11. The mobile terminal of claim 10, wherein the controller displays a list including the at least one mail address information belonging to the group and automatically set at least one mail address corresponding to the at least one mail address information selected from the list as the recipient or carbon copy mail address of the second mail.

12. The mobile terminal of claim 1, wherein when information associated with a specific mail address is included in a text content of the second mail composed through the composing window, the controller automatically sets a mail address corresponding to the information as the recipient or carbon copy mail address of the second mail.

13. The mobile terminal of claim 1, wherein when the at least one mail address information is selected, the controller deletes the selected mail address information from the first mail.

14. The mobile terminal of claim 1, wherein when the at least one mail address information is selected, the controller displays a UI (user interface) for selecting all mail address informations included in the first mail and deletes at least one mail address information selected through the UI from the first mail.

15. The mobile terminal of claim 1, wherein when at least one original text in the first mail is selected, the controller deletes the selected at least one original text from the first mail.

16. The mobile terminal of claim 15, wherein when the at least one original text is selected, the controller displays a UI (user interface) for selecting each original text included in the first mail and deletes at least one original text selected through the UI from the first mail.

17. The mobile terminal of claim 1, wherein the controller converts mail address informations included in the at least one original text within the first mail to a single summary information and then displays the single summary information.

18. The mobile terminal of claim 1, wherein the controller converts the at least one original text within the first mail to a single summary information and displays the signal summary information.

19. A method of controlling a mobile terminal, the method comprising:
receiving at least one first mail;
displaying the received first mail;
when a command for a reply or forwarding of the first mail is inputted, displaying a composing window of a second mail including the first mail; and
when at least one mail address information included in at least one original text in the first mail is selected from the composing window, automatically setting a mail address corresponding to the selected mail address information as a recipient or carbon copy mail address of the first mail, and
wherein:
the composing window includes a first setting region for a recipient mail address setting and a second setting region for a carbon copy mail address setting, and
the method further comprises:
determining whether the mail address corresponding to the selected mail address information is a carbon copy mail address or a recipient mail address in a corresponding original text within the first mail;
when the determined mail address is not the carbon copy mail address but is the recipient mail address in the corresponding original text, automatically setting the determined mail address in the first setting region; and
when the determined mail address is not the recipient mail address but is the carbon copy mail address in the corresponding original text, automatically setting the determined mail address in the second setting region.

* * * * *